(12) United States Patent
Utsunomiya

(10) Patent No.: US 12,515,338 B2
(45) Date of Patent: Jan. 6, 2026

(54) ROBOT TEACHING METHOD AND THREE-DIMENSIONAL OBJECT PRINTER

(71) Applicant: SEIKO EPSON CORPORATION, Tokyo (JP)

(72) Inventor: Kohei Utsunomiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 18/469,610

(22) Filed: Sep. 19, 2023

(65) Prior Publication Data
US 2024/0100700 A1  Mar. 28, 2024

(30) Foreign Application Priority Data

Sep. 22, 2022 (JP) ................................. 2022-151025

(51) Int. Cl.
| | |
|---|---|
| *B25J 9/16* | (2006.01) |
| *B25J 15/00* | (2006.01) |
| *B33Y 10/00* | (2015.01) |
| *B33Y 30/00* | (2015.01) |

(52) U.S. Cl.
CPC .......... *B25J 9/1669* (2013.01); *B25J 9/1664* (2013.01); *B25J 15/0019* (2013.01); *B33Y 10/00* (2014.12); *B33Y 30/00* (2014.12)

(58) Field of Classification Search
CPC .... B25J 9/1669; B25J 9/1664; B25J 15/0019; B33Y 10/00; B33Y 30/00; G05B 2219/45186
See application file for complete search history.

(56) References Cited

U.S. PATENT DOCUMENTS

| | | | |
|---|---|---|---|
| 2005/0038563 A1* | 2/2005 | Rauf | B25J 9/1623 700/245 |
| 2013/0166061 A1* | 6/2013 | Yamamoto | B25J 9/1669 700/214 |
| 2015/0042716 A1 | 2/2015 | Beier et al. | |
| 2016/0176115 A1* | 6/2016 | Becker | B25J 9/1679 425/150 |
| 2018/0065254 A1* | 3/2018 | Okahisa | B25J 9/06 |
| 2018/0085920 A1* | 3/2018 | Yamada | B25J 9/1635 |
| 2018/0126553 A1* | 5/2018 | Corkum | B25J 9/1697 |
| 2019/0126471 A1* | 5/2019 | Kobayashi | B25J 9/163 |
| 2020/0269602 A1* | 8/2020 | Lewis | B25J 9/1679 |
| 2021/0107231 A1* | 4/2021 | Yao | G06T 17/20 |

(Continued)

FOREIGN PATENT DOCUMENTS

| | | |
|---|---|---|
| JP | H06-285762 A | 10/1994 |
| JP | 2015-520011 A | 7/2015 |
| JP | 2023-031611 A | 3/2023 |

*Primary Examiner* — Sohana Tanju Khayer
(74) *Attorney, Agent, or Firm* — WORKMAN NYDEGGER

(57) ABSTRACT

A robot teaching method includes: a printing posture setting step of setting a printing posture that is a relative posture between the head and the workpiece in the printing operation. When a position where a positional relationship with the nozzle surface is fixed is a first position and a position different from the first position where a positional relationship with the nozzle surface is fixed is a third position, the printing posture is set in a virtual space in the printing posture setting step based on a positional relationship between the first position and the workpiece and a positional relationship between the third position and the workpiece.

20 Claims, 12 Drawing Sheets

(56) References Cited

U.S. PATENT DOCUMENTS

| | | | |
|---|---|---|---|
| 2023/0001581 A1* | 1/2023 | Saito | B25J 9/1664 |
| 2023/0031850 A1* | 2/2023 | Parrott | B29C 64/232 |
| 2023/0051995 A1* | 2/2023 | Karri | B25J 11/00 |
| 2023/0398688 A1* | 12/2023 | Hida | B23K 37/0229 |
| 2024/0009836 A1* | 1/2024 | Kondou | B25J 13/085 |
| 2024/0058881 A1* | 2/2024 | Gruber | B23K 9/0953 |
| 2024/0238969 A1* | 7/2024 | Kanai | B25J 9/163 |
| 2024/0382212 A1* | 11/2024 | Shamaei | A61B 17/142 |

* cited by examiner

ROBOT TEACHING METHOD AND THREE-DIMENSIONAL OBJECT PRINTER

The present application is based on, and claims priority from JP Application Serial Number 2022-151025, filed Sep. 22, 2022, the disclosure of which is hereby incorporated by reference herein in its entirety.

BACKGROUND

1. Technical Field

The present disclosure relates to a robot teaching method and a three-dimensional object printer.

2. Related Art

There has been known an apparatus that uses a robot to perform printing on the surface of a three-dimensional workpiece by an ink jet method. For example, a system described in JP-T-2015-520011 includes a robot and a printing head disposed on the robot for ejecting ink droplets from the printing head onto a curved surface of an object.

JP-T-2015-520011 discloses a method including the steps of: three-dimensionally measuring a region on the surface of the object; creating a set of spatial points corresponding to the region; creating a three-dimensional net corresponding to the region; and creating a three-dimensional path for moving the robot.

JP-T-2015-520011 does not disclose a specific method for creating a three-dimensional path. In order to perform high-quality printing on the surface of a workpiece using the robot, it is desired to realize an appropriate method of teaching the robot according to the shape of the workpiece.

SUMMARY

An aspect of a robot teaching method according to the present disclosure to solve the problem is a robot teaching method for a three-dimensional object printer that includes a head having a nozzle surface provided with a nozzle array including a plurality of nozzles, and a robot, and that executes a printing operation in which the head discharges a liquid onto a three-dimensional workpiece and the robot changes a relative position and posture between the head and the workpiece, including: a printing posture setting step of setting a printing posture that is a relative posture between the head and the workpiece in the printing operation, in which when a position where a positional relationship with the nozzle surface is fixed is a first position, and a position different from the first position where a positional relationship with the nozzle surface is fixed is a third position, the printing posture is set in a virtual space in the printing posture setting step based on a positional relationship between the first position and the workpiece and a positional relationship between the third position and the workpiece.

Another aspect of a robot teaching method according to the present disclosure to solve the problem is a robot teaching method for a three-dimensional object printer that includes a head having a nozzle surface provided with N, N being a natural number of greater than or equal to 2, nozzle arrays including a plurality of nozzles, and a robot, and that executes a printing operation in which the head discharges a liquid onto a three-dimensional workpiece and the robot changes a relative position and posture between the head and the workpiece, including: a printing posture setting step of setting a printing posture that is a relative posture between the head and the workpiece in the printing operation, in which N positions whose positional relationship with the nozzle surface is fixed and which are provided so as to correspond to the N nozzle arrays, respectively, and the printing posture is set based on a positional relationship with the workpiece at the N positions in a virtual space in the printing posture setting step.

An aspect of a three-dimensional object printer according to the present disclosure to solve the problem is a three-dimensional object printer including: a head having a nozzle surface provided with a nozzle array including a plurality of nozzles that discharge a liquid; and a robot that changes a relative position and posture between the head and a three-dimensional workpiece, in which the nozzle array includes a first nozzle array and a second nozzle array, which are arranged in a width direction, when a straight line passing through a first position on the nozzle surface and a second position on the workpiece is a first straight line, a normal line of the workpiece at the second position is a first normal line, an angle formed by the first straight line and the first normal line is a first angle, a straight line passing through a third position different from the first position on the nozzle surface and a fourth position different from the second position on the workpiece is a second straight line, a normal line of the workpiece at the fourth position is a second normal line, and an angle formed by the second straight line and the second normal line is a second angle, when a first printing operation is executed in which the liquid is discharged from the first nozzle array onto the workpiece and no liquid is discharged from the second nozzle array, a relative posture between the head and the workpiece is set based on the first angle and not based on the second angle, and when a second printing operation is executed in which the liquid is discharged from both the first and second nozzle arrays onto the workpiece, a relative posture between the head and the workpiece is set based on the first and second angles.

DESCRIPTION OF EMBODIMENTS

Figure 1:
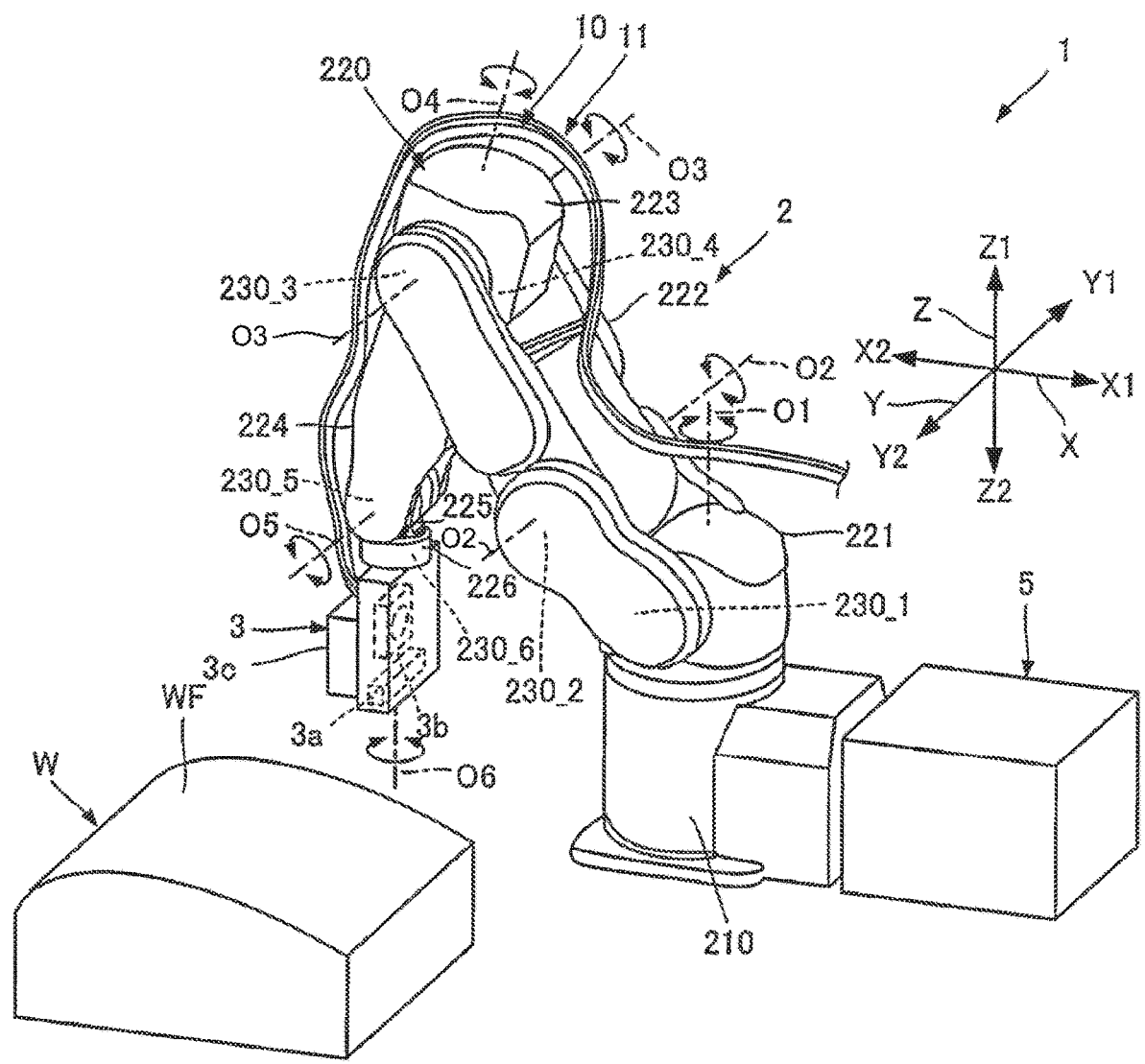
FIG. 1 is a perspective view schematically illustrating a three-dimensional object printer according to an embodiment.

Hereinafter, preferred embodiments according to the present disclosure will be described with reference to the accompanying drawings. In the drawings, the dimensions and scale of each component are appropriately different from the actual ones, and some parts are schematically illustrated for easy understanding. Furthermore, the scope of the present disclosure is not limited to such embodiments unless otherwise specified in the following description.

For convenience, the following description will be given appropriately using an X-axis, a Y-axis, and a Z-axis that intersect each other. Also, in the following description, one direction along the X-axis is an X1 direction, and a direction opposite to the X1 direction is an X2 direction. Likewise, directions opposite to each other along the Y-axis are a Y1 direction and a Y2 direction. Also, directions opposite to each other along the Z-axis are a Z1 direction and a Z2 direction.

The X-axis, Y-axis, and Z-axis correspond to coordinate axes of a world coordinate system set in a space in which a robot 2 to be described later is installed. Typically, the Z-axis is a vertical axis and the Z2 direction corresponds to a downward direction in a vertical direction. A base coordinate system based on a position of a base section 210 to be described later of the robot 2 is associated with the world coordinate system by calibration. In the following, for convenience, description is given of a case where the operation of the robot 2 is controlled by using the world coordinate system as a robot coordinate system.

The Z-axis does not have to be the vertical axis. The X-axis, Y-axis, and Z-axis are typically orthogonal to each other. However, the present disclosure is not limited thereto, and the X-axis, Y-axis, and Z-axis are not orthogonal to each other in some cases. For example, the X-axis, Y-axis, and Z-axis may intersect each other at an angle within a range from 80° to 100°.

1-1. Overview of Three-Dimensional Object Printer

FIG. 1 is a perspective view schematically illustrating a three-dimensional object printer 1 according to an embodiment. The three-dimensional object printer 1 performs ink jet printing on a surface of a workpiece W having a three-dimensional shape.

The workpiece W has a surface WF on which printing is performed. In an example illustrated in FIG. 1, the surface WF is a convex curved surface having a plurality of portions with different curvatures. The workpiece W at the time of printing is supported by a structure such as a predetermined installation table, a robot hand, or a conveyor, when necessary. Note that the surface to be printed may be a surface other than the surface WF among a plurality of surfaces of the workpiece W. Moreover, the size, shape, and installation posture of the workpiece W are not limited to the example illustrated in FIG. 1 but are arbitrary.

As illustrated in FIG. 1, the three-dimensional object printer 1 includes the robot 2, a head unit 3, a controller 5, a piping section 10, and a wiring section 11. First, these components will be briefly described below in order.

The robot 2 is a robot that changes a position and a posture of the head unit 3 in the world coordinate system. In the example illustrated in FIG. 1, the robot 2 is a so-called six-axis vertical articulated robot.

As illustrated in FIG. 1, the robot 2 has the base section 210 and an arm section 220.

The base section 210 is a table that supports the arm section 220. In the example illustrated in FIG. 1, the base section 210 is fixed by screwing or the like to an installation surface such as a floor surface or a base facing the Z1 direction. The installation surface to which the base section 210 is fixed may be a surface facing in any direction, and is not limited to the example illustrated in FIG. 1 but may be, for example, a surface of a wall, a ceiling, a movable trolley, or the like.

The arm section 220 is a six-axis robot arm having a base end attached to the base section 210 and a tip that changes its position and posture three-dimensionally with respect to the base end. To be more specific, the arm section 220 has arms 221, 222, 223, 224, 225, and 226, which are also referred to as links and coupled in this order.

The arm 221 is rotatably coupled to the base section 210 around a rotation axis O1 via a joint section 230_1. The arm 222 is rotatably coupled to the arm 221 around a rotation axis O2 via a joint section 230_2. The arm 223 is rotatably coupled to the arm 222 around a rotation axis O3 via a joint section 230_3. The arm 224 is rotatably coupled to the arm 223 around the rotation axis O4 via the joint section 230_4. The arm 225 is rotatably coupled to the arm 224 around a rotation axis O5 via a joint section 230_5. The arm 226 is rotatably coupled to the arm 225 around a rotation axis O6 via a joint section 230_6.

Each of the joint sections 230_1 to 230_6 is a mechanism for rotatably coupling one of two adjacent members among the base section 210 and the arms 221 to 226 to the other. In the following, each of the joint sections 230_1 to 230_6 may be referred to as the "joint section 230".

Although not illustrated in FIG. 1, each of the joint sections 230_1 to 230_6 is provided with a drive mechanism to rotate one of the two corresponding members adjacent to each other with respect to the other. The drive mechanism includes, for example, a motor that generates driving force for the rotation, a speed reducer that decelerates and outputs the driving force, and an encoder such as a rotary encoder that detects an operating amount such as an angle of the rotation. The assembly of the drive mechanisms of the joint sections 230_1 to 230_6 corresponds to an arm drive mechanism 2a illustrated in FIG. 2 to be described later.

The rotation axis O1 is an axis perpendicular to the installation surface, which is not illustrated, to which the base section 210 is fixed. The rotation axis O2 is an axis perpendicular to the rotation axis O1. The rotation axis O3 is an axis parallel to the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

Regarding these rotation axes, "perpendicular" includes not only when the angle formed by any two rotation axes is exactly 90°, but also when the angle formed by any two rotation axes deviates from 90° by about ±5°. Likewise, "parallel" includes not only when any two rotation axes are strictly parallel, but also when one of any two rotation axes is tilted within a range of about ±5° with respect to the other.

The head unit 3 is attached, as an end effector, to the arm 226 located at the foremost end of the arms 221 to 226 of the robot 2 in a state where the head unit 3 is fixed by screwing or the like.

The head unit 3 is an assembly having a head 3a that discharges ink, which is an example of a "liquid", toward the workpiece W. In this embodiment, the head unit 3 has a pressure regulating valve 3b and an energy emitter 3c, besides the head 3a. The head unit 3 will be described in detail with reference to FIG. 3 to be described later.

The ink is not particularly limited, and examples of the ink include an aqueous ink having a coloring material such as a dye or a pigment dissolved in an aqueous solvent, a curable ink using a curable resin such as an ultraviolet curable type, and a solvent-based ink having a coloring material such as a dye or a pigment dissolved in an organic solvent, and the like. Among the above, the curable ink is preferably used. The curable ink is not particularly limited but may be, for example, any of a thermosetting type, a photocurable type, a radiation curable type, an electron beam curable type, and the like. Among the above, the photocurable type such as an ultraviolet curable type is preferable. The ink is not limited to a solution but may be an ink having a coloring material or the like dispersed as a dispersoid in a dispersion medium. Alternatively, the ink is not limited to that containing a coloring material but may be an ink containing conductive particles such as metal particles for forming a wire or the like as a dispersoid, a clear ink, or a treatment liquid for surface treatment of the workpiece W.

The piping section 10 and the wiring section 11 are coupled to the head unit 3, respectively. The piping section 10 is a piping or piping group that supplies ink from an ink tank, which is not illustrated, to the head unit 3. The wiring section 11 is a wiring or wiring group that supplies an electric signal for driving the head 3a.

Figure 2:
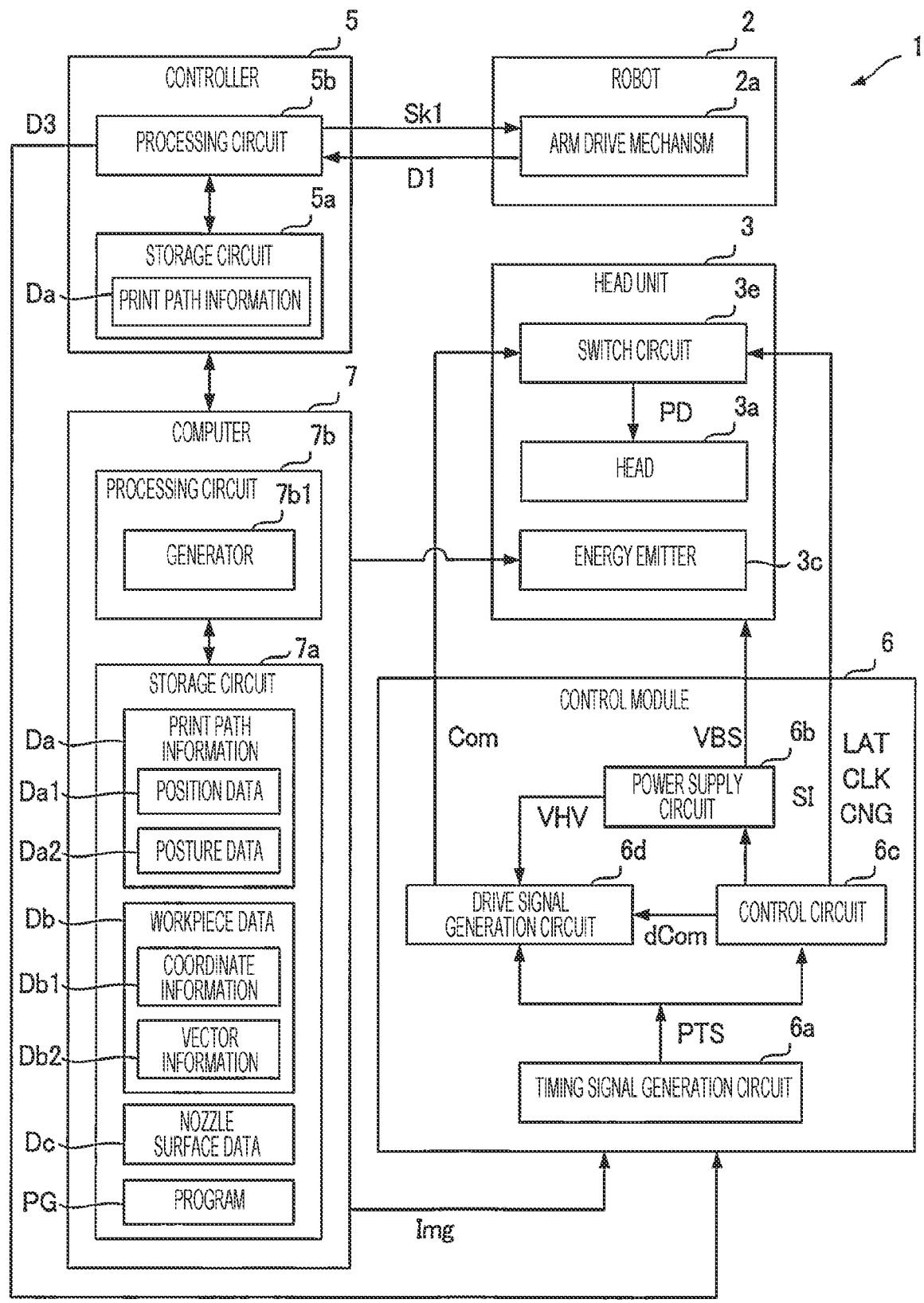
FIG. 2 is a block diagram illustrating an electrical configuration of the three-dimensional object printer according to the embodiment.

The controller 5 is a robot controller that controls the drive of the robot 2. With reference to FIG. 2, an electrical configuration of the three-dimensional object printer 1 will be described below, including detailed description of the controller 5.

1-2. Electrical Configuration of Three-Dimensional Object Printer

FIG. 2 is a block diagram illustrating an electrical configuration of the three-dimensional object printer 1 according to the embodiment. FIG. 2 illustrates electrical components among the components of the three-dimensional object printer 1. As illustrated in FIG. 2, the three-dimensional object printer 1 includes, in addition to the components illustrated in FIG. 1 described above, a control module 6 communicably coupled to the controller 5 and a computer 7 communicably coupled to the controller 5 and to the control module 6.

Each of the electrical components illustrated in FIG. 2 may be appropriately divided, may be partially included in other components, or may be integrally configured with other components. For example, a part or all of the functions of the controller 5 or the control module 6 may be realized by the computer 7, or may be realized by another external device such as a personal computer (PC) coupled to the controller 5 via a network such as a local area network (LAN) or the Internet.

The controller 5 has a function to control the drive of the robot 2 and a function to generate a signal D3 for synchronizing an ink discharge operation in the head unit 3 with the operation of the robot 2.

The controller 5 includes a storage circuit 5a and a processing circuit 5b.

The storage circuit 5a stores various programs to be executed by the processing circuit 5b and various data to be processed by the processing circuit 5b. The storage circuit 5a includes, for example, one or both of semiconductor memories including a volatile memory such as a random access memory (RAM) and a non-volatile memory such as a read only memory (ROM), an electrically erasable programmable read-only memory (EEPROM), or a programmable ROM (PROM). A part or all of the storage circuit 5a may be included in the processing circuit 5b.

The storage circuit 5a stores print path information Da. The print path information Da is used to control the operation of the robot 2 and indicates the position and posture of the head 3a in a path to be taken by the head 3a. That is, the print path information Da includes: position data Da1 indicating the position of the head 3a in the path to be taken by the head 3a; and posture data Da2 indicating the posture of the head 3a on the path to be taken by the head 3a. The position data Da1 indicates a printing position that is a relative position between the head 3a and the workpiece W during execution of a print operation to apply ink ejected from nozzles N to the workpiece W. The posture data Da2 indicates a printing posture that is a relative posture between the head 3a and the workpiece W at the printing position indicated by the position data Da1. The print path information Da is expressed using coordinate values of the base coordinate system or the world coordinate system, for example. The print path information Da is generated by the computer 7 based on workpiece data Db and nozzle surface data Dc in a method of teaching the robot 2 to be described later. Such print path information Da is inputted from the computer 7 to the storage circuit 5a. Note that the print path information Da may be expressed using coordinate values of a workpiece coordinate system. In this case, the print path information Da is used to control the operation of the robot 2 after converting the coordinate values of the workpiece coordinate system into the coordinate values of the base coordinate system or the world coordinate system.

The processing circuit 5b controls the operation of the arm drive mechanism 2a of the robot 2 based on the print path information Da, and also generates the signal D3. The processing circuit 5b includes, for example, one or more processors such as a central processing unit (CPU). The processing circuit 5b may include a programmable logic device such as a field-programmable gate array (FPGA) in place of or in addition to the CPU.

The arm drive mechanism 2a is an assembly of the drive mechanisms of the joint sections 230_1 to 230_6 described above and includes, for each joint section 230, a motor for driving the joint section of the robot 2 and an encoder that detects a rotation angle of the joint section of the robot 2.

The processing circuit 5b performs inverse kinematics calculation, which is a calculation for converting the print path information Da into a movement amount such as a rotation angle and a rotation speed of each joint sections 230 of the robot 2. The processing circuit 5b outputs a control signal Sk1 based on an output D1 from each encoder of the arm drive mechanism 2a so that the actual movement amount such as the rotation angle and rotation speed of each joint sections 230 is obtained as a result of the calculation described above based on the print path information Da. The control signal Sk1 controls the drive of the motor of the arm drive mechanism 2a. The control signal Sk1 is corrected by the processing circuit 5b based on an output from a distance sensor, which is not illustrated, when necessary.

The processing circuit 5*b* also generates the signal D3 based on the output D1 from at least one of the plurality of encoders of the arm drive mechanism 2*a*. For example, the processing circuit 5*b* generates, as the signal D3, a trigger signal including a pulse at a timing when the output D1 from one of the plurality of encoders takes a predetermined value.

The control module 6 is a circuit that controls the ink discharge operation in the head unit 3 based on the signal D3 outputted from the controller 5 and print data from the computer 7. The control module 6 includes a timing signal generation circuit 6*a*, a power supply circuit 6*b*, a control circuit 6*c*, and a drive signal generation circuit 6*d*.

The timing signal generation circuit 6*a* generates a timing signal PTS based on the signal D3. The timing signal generation circuit 6*a* includes, for example, a timer that starts generation of the timing signal PTS upon detection of the signal D3.

The power supply circuit 6*b* receives power from a commercial power source, which is not illustrated, and generates various predetermined potentials. The various potentials generated are appropriately supplied to each part of the control module 6 and the head unit 3. For example, the power supply circuit 6*b* generates a power supply potential VHV and an offset potential VBS. The offset potential VBS is supplied to the head unit 3. The power supply potential VHV is supplied to the drive signal generation circuit 6*d*.

The control circuit 6*c* generates, based on the timing signal PTS, a control signal SI, a waveform designation signal dCom, a latch signal LAT, a clock signal CLK, and a change signal CNG. These signals are synchronized with the timing signal PTS. Among these signals, the waveform designation signal dCom is inputted to the drive signal generation circuit 6*d*, and the other signals are inputted to a switch circuit 3*e* in the head unit 3.

The control signal SI is a digital signal for specifying an operating state of a drive element included in the head 3*a* of the head unit 3. To be more specific, the control signal SI specifies whether to supply a drive signal Com to be described later to the drive element based on the print data. This specification determines, for example, whether to discharge ink from a nozzle corresponding to the drive element and also determines the amount of ink discharged from the nozzle. The waveform designation signal dCom is a digital signal for specifying the waveform of the drive signal Com. The latch signal LAT and the change signal CNG are used in combination with the control signal SI, and the drive timing of the drive element is defined to specify the ink discharge timing from the nozzle. The clock signal CLK is a reference clock signal synchronized with the timing signal PTS.

The control circuit 6*c* described above includes, for example, one or more processors such as a CPU. The control circuit 6*c* may include a programmable logic device such as a field-programmable gate array (FPGA) in place of or in addition to the CPU.

The drive signal generation circuit 6*d* is a circuit that generates a drive signal Com for driving each drive element included in the head 3*a* of the head unit 3. To be more specific, the drive signal generation circuit 6*d* has a DA conversion circuit and an amplifier circuit, for example. In the drive signal generation circuit 6*d*, the DA conversion circuit converts the waveform designation signal dCom from the control circuit 6*c* from a digital signal to an analog signal, and the amplifier circuit uses the power supply potential VHV from the power supply circuit 6*b* to amplify the analog signal. Thus, the drive signal Com is generated. Among the waveforms included in the drive signal Com, a signal having the waveform actually supplied to the drive element is a drive pulse PD. The drive pulse PD is supplied to the drive element from the drive signal generation circuit 6*d* via the switch circuit 3*e* in the head unit 3.

Here, the switch circuit 3*e* is a circuit including a switching element that switches, based on the control signal SI, whether to supply at least part of the waveform included in the drive signal Com as the drive pulse PD.

The computer 7 is a desktop or notebook computer in which programs such as a program PG are installed. The computer 7 has a function to generate the print path information Da, a function to supply information such as the print path information Da to the controller 5, and a function to supply information such as print data Img to the control module 6. In addition to these functions, the computer 7 according to this embodiment also has a function to control the drive of the energy emitter 3*c*.

The computer 7 includes a storage circuit 7*a* and a processing circuit 7*b*. In addition, although not illustrated, the computer 7 has an input device such as a keyboard or mouse for receiving operations from a user. The computer 7 may have a display device such as a liquid crystal panel for displaying information required to generate the print path information Da.

The storage circuit 7*a* stores various programs executed by the processing circuit 7*b* and various data processed by the processing circuit 7*b*. The storage circuit 7*a* includes, for example, one or both semiconductor memories including a volatile memory such as a RAM and a non-volatile memory such as a ROM, an EEPROM or a PROM. A part or all of the storage circuit 7*a* may be included in the processing circuit 7*b*.

The storage circuit 7*a* stores the print path information Da, workpiece data Db, nozzle surface data Dc, and the program PG.

The program PG is a program for generating the print path information Da based on the workpiece data Db and the nozzle surface data Dc.

The workpiece data Db is data representing the shape of at least a part of the workpiece W. To be more specific, the workpiece data Db is three-dimensional data of standard triangulated language (STL) format representing the shape of the workpiece W with a plurality of polygons. The workpiece data Db includes coordinate information Db1, which is information about coordinates of each vertex of the polygon, and vector information Db2, which is information about a normal vector indicating the front and back of a polygon surface. The workpiece data Db is obtained by converting computer-aided design (CAD) data representing the three-dimensional shape of the workpiece W, as necessary. The workpiece data Db may be expressed using coordinate values in the workpiece coordinate system, or may be expressed by point group data using coordinate values in the base coordinate system or the world coordinate system. Alternatively, the workpiece data Db may be expressed by a formula or the like, and the format of the workpiece data Db may be converted as necessary.

The nozzle surface data Dc is data representing the shape of at least a part of the nozzle surface FN. To be more specific, the nozzle surface data Dc is three-dimensional data of standard triangulated language (STL) format representing the shape of the nozzle surface FN with a plurality of polygons. The nozzle surface data Dc is obtained by converting computer-aided design (CAD) data representing the three-dimensional shape of the nozzle surface FN, as necessary. The nozzle surface data Dc may be expressed using coordinate values in the workpiece coordinate system, or may be expressed by point group data using coordinate values in the base coordinate system or the world coordinate system. Alternatively, the nozzle surface data Dc may be expressed by a formula or the like, and the format of the nozzle surface data Dc may be appropriately converted as necessary.

The processing circuit 7b implements the functions described above by executing a program such as the program PG. The processing circuit 7b includes, for example, one or more processors such as a CPU. The processing circuit 7b may include a programmable logic device such as an FPGA in place of or in addition to the CPU.

The processing circuit 7b functions as a generator 7b1 by executing the program PG. The generator 7b1 generates the print path information Da based on the workpiece data Db. The generation of the print path information Da by the generator 7b1 will be described in detail later with reference to FIGS. 5 to 15.

1-3. Head Unit Configuration

Figure 3:
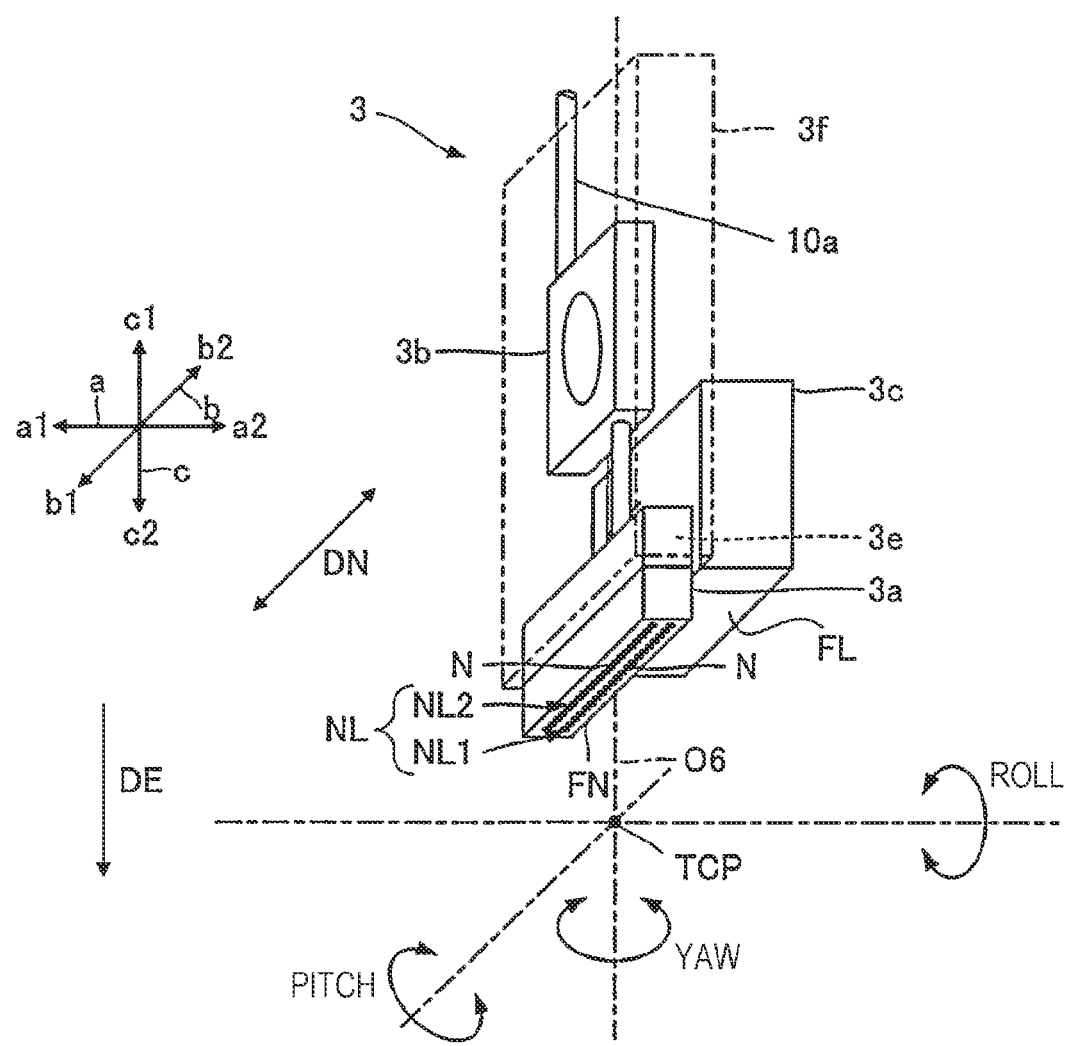
FIG. 3 is a perspective view illustrating a schematic configuration of a head unit.

FIG. 3 is a perspective view illustrating a schematic configuration of the head unit 3. For convenience, the following description will be given appropriately using an a-axis, a b-axis, and a c-axis that intersect each other. In the following description, one direction along the a-axis is an a1 direction, and a direction opposite to the a1 direction is an a2 direction. Likewise, directions opposite to each other along the b-axis are a b1 direction and a b2 direction. Also, directions opposite to each other along the c-axis are a c1 direction and a c2 direction.

The a-axis, the b-axis, and the c-axis correspond to coordinate axes of a tool coordinate system set in the head unit 3. The relationships between positions and postures change relative to the world coordinate system or robot coordinate system described above according to the operation of the robot 2 described above. In the example illustrated in FIG. 3, the c-axis is parallel to the rotation axis O6 described above. The a-axis, b-axis, and c-axis are typically orthogonal to each other, but the present disclosure is not limited thereto and the axes may intersect at an angle within a range from 80° to 100°, for example. The tool coordinate system and the base coordinate system or the robot coordinate system are associated with each other by calibration.

Hereinafter, the a-axis may be referred to as a "roll axis", the b-axis as a "pitch axis", and the c-axis as a "yaw axis". Also, the rotation about the a-axis may be referred to as "roll", the rotation about the b-axis as "pitch", and the rotation about the c-axis as "yaw".

The tool coordinate system is set based on the tool center point TCP. Therefore, the position and posture of the head 3a are defined based on the tool center point TCP. In the example illustrated in FIG. 3, the tool center point TCP is set in a space away from the head 3a in an ink discharge direction DE. Note that the position of the tool center point TCP is not limited to the example illustrated in FIG. 3, and may be the center of the nozzle surface FN, for example.

As described above, the head unit 3 includes the head 3a, the pressure regulating valve 3b, and the energy emitter 3c. These are supported by a support 3f indicated by the chain double-dashed line in FIG. 3. In the example illustrated in FIG. 3, the head unit 3 includes one head 3a and one pressure regulating valve 3b. However, the present disclosure is not limited to the example illustrated in FIG. 3, and the head unit 3 may include two or more heads and valves. Also, the installation position of the pressure regulating valve 3b is not limited to the arm 226, but may be another arm, for example, or the like, or may be a fixed position with respect to the base section 210.

The support 3f is made of a metal material, for example, and is a substantially rigid body. In FIG. 3, the support 3f has a flat box shape, but the shape of the support 3f is not particularly limited and is optionally selected.

The support 3f described above is attached to the arm 226 described above. Therefore, the head 3a, the pressure regulating valve 3b, and the energy emitter 3c are collectively supported on the arm 226 by the support 3f. Thus, the relative positions of the head 3a, the pressure regulating valve 3b, and the energy emitter 3c with respect to the arm 226 are fixed. In the example illustrated in FIG. 3, the pressure regulating valve 3b is arranged at a position in the c1 direction with respect to the head 3a. The energy emitter 3c is arranged at a position in the a2 direction with respect to the head 3a.

The head 3a has a nozzle surface FN and a plurality of nozzles N that open to the nozzle surface FN. The nozzle surface FN is a nozzle surface on which the nozzles N are opened, and is made of a material such as silicon (Si) or metal, for example. Alternatively, when another member is arranged as a component of the head unit 3 on a plane extending from the plate surface, the nozzle surface FN is a surface formed by the plate surface of the nozzle plate and the surface of the other member. Here, the nozzle plate is a plate-like member made of silicon, metal, or the like in which a plurality of nozzles N are formed. Examples of such other member include a fixing plate, a cover head, and the like. The fixing plate is a member provided around the nozzle plate for the purpose of fixing or protecting the nozzle plate. The cover head is a member provided for the purpose of protecting the head 3a, and the like and has a portion arranged around the nozzle plate. Note that the fixing plate and the cover head may not be provided depending on the configuration of the head 3a. The surfaces of the fixed plate and the cover head may differ in position from the plate surface of the nozzle plate by a maximum of about 0.8 mm in the direction along the c-axis. In the example illustrated in FIG. 3, the nozzle surface FN includes only the plate surface of one nozzle plate, but may have a plurality of nozzle plates. In that case, the nozzle surface FN is defined as the plane containing the plurality of nozzle plates. In the example illustrated in FIG. 3, a direction normal to the nozzle surface FN, that is, an ink discharge direction DE from the nozzles N is the c2 direction. Strictly speaking, the discharge direction DE may not be parallel to the c2 direction due to inertia, airflow, and the like caused by the operation of the robot 2, but such an error is not taken into consideration in this embodiment.

The plurality of nozzles N are divided into a first nozzle array NL1 and a second nozzle array NL2, which are arranged with a space therebetween in a direction along the a-axis. Each of the first and second nozzle arrays NL1 and NL2 is a set of the plurality of nozzles N linearly arranged in a nozzle array direction DN that is a direction along the b-axis. In the head 3a, the elements related to the nozzles N in the first nozzle array NL1 and the elements related to the nozzles N in the second nozzle array NL2 are configured to be substantially symmetrical to each other in the direction along the a-axis.

However, positions of the plurality of nozzles N in the first nozzle array NL1 and positions of the plurality of nozzles N in the second nozzle array NL2 may correspond to each other or may be different from each other in the direction along the b-axis. Also, the elements related to the nozzles N in one of the first and second nozzle arrays NL1 and NL2 may be omitted. The following description is given of a configuration where the positions of the plurality of nozzles N in the first nozzle array NL1 and the positions of the plurality of nozzles N in the second nozzle array NL2 correspond to each other in the direction along the b-axis.

Hereinafter, the first and second nozzle arrays NL1 and NL2 may be collectively referred to as the nozzle arrays NL. The nozzle arrays NL include the first and second nozzle arrays NL1 and NL2.

Although not illustrated, the head 3a has, for each nozzle N, a piezoelectric element as a drive element and a cavity for accommodating ink. The piezoelectric element causes ink to be discharged in the discharge direction DE from the nozzle corresponding to the cavity by changing the pressure in the cavity corresponding to the piezoelectric element. Such a head 3a may be obtained, for example, by attaching a plurality of substrates such as a silicon substrate appropriately processed by etching or the like with an adhesive or the like. As the drive element for discharging ink from the nozzles, a heater that heats the ink inside the cavity may be used instead of the piezoelectric element.

As described above, ink is supplied to the head 3a from an ink tank, which is not illustrated, via a supply pipe 10a of the piping section 10. The pressure regulating valve 3b is interposed between the supply pipe 10a and the head 3a.

The energy emitter 3c emits energy such as light, heat, electron beams, or radiation for curing or solidifying the ink on the workpiece W. For example, when the ink is ultraviolet curable, the energy emitter 3c includes a light emitting element such as a light emitting diode (LED) that emits ultraviolet rays. The energy emitter 3c may appropriately include an optical component such as a lens for adjusting an emission direction or emission range of energy.

1-4. Printing Operation of Robot 2

Figure 4:
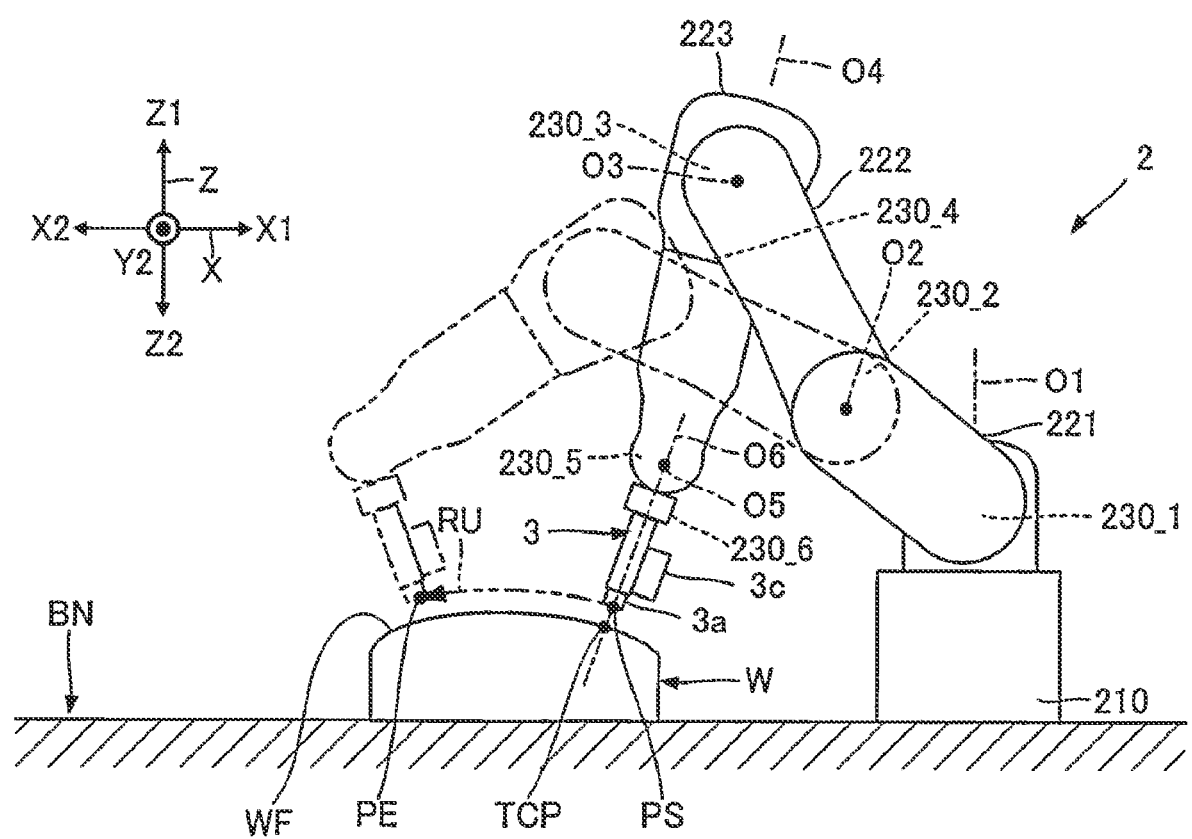
FIG. 4 is a diagram for explaining an example of a printing operation of a robot.

FIG. 4 is a diagram for explaining an example of a printing operation of the robot 2. FIG. 4 illustrates a case where printing is performed on the surface WF of the workpiece W mounted at a position in the X2 direction relative to the robot 2.

In the printing operation, ink appropriately discharged from the nozzles N based on the print data is applied to the workpiece W. Thus, printing is performed on the workpiece W with the ink. In this event, the robot 2 changes the position and posture of the head 3a based on the print path information Da. In other words, the printing operation is an operation in which the robot 2 changes the positions and postures of the head 3a and the workpiece W while the three-dimensional object printer 1 discharges the ink onto the workpiece W from the head 3a. Thus, the head 3a moves along a movement path RU based on the position data Da1 while maintaining a predetermined posture based on the posture data Da2 with respect to the surface WF. The movement path RU is a path from a position PS to a position PE.

In the example illustrated in FIG. 4, the movement path RU extends along the X-axis when viewed in the Z2 direction. During the execution of the printing operation, the robot 2 mainly operates three of the joint sections 230, including the joint sections 230_2, 230_3, and 230_5. Here, the rotation axes of the three joint sections 230 are set parallel to the Y-axis, and only the three joint sections 230 are operated to stably move the head 3a. However, depending on the set print path and printing posture, it may be necessary to operate other joint sections 230. Therefore, the joints to be operated need not be particularly limited.

Note that the robot 2 may perform the printing operation by operating four or more joint sections 230 out of the six joint sections 230. In this case, the installation position and installation posture of the workpiece W are not limited to the example illustrated in FIG. 4 but are arbitrary. The movement path RU is determined according to the shape of the workpiece W, the printing range, the installation position, the installation posture, and the like, and is not limited to the example illustrated in FIG. 4 but is arbitrary.

1-5. Teaching Method for Robot 2

Figure 5:
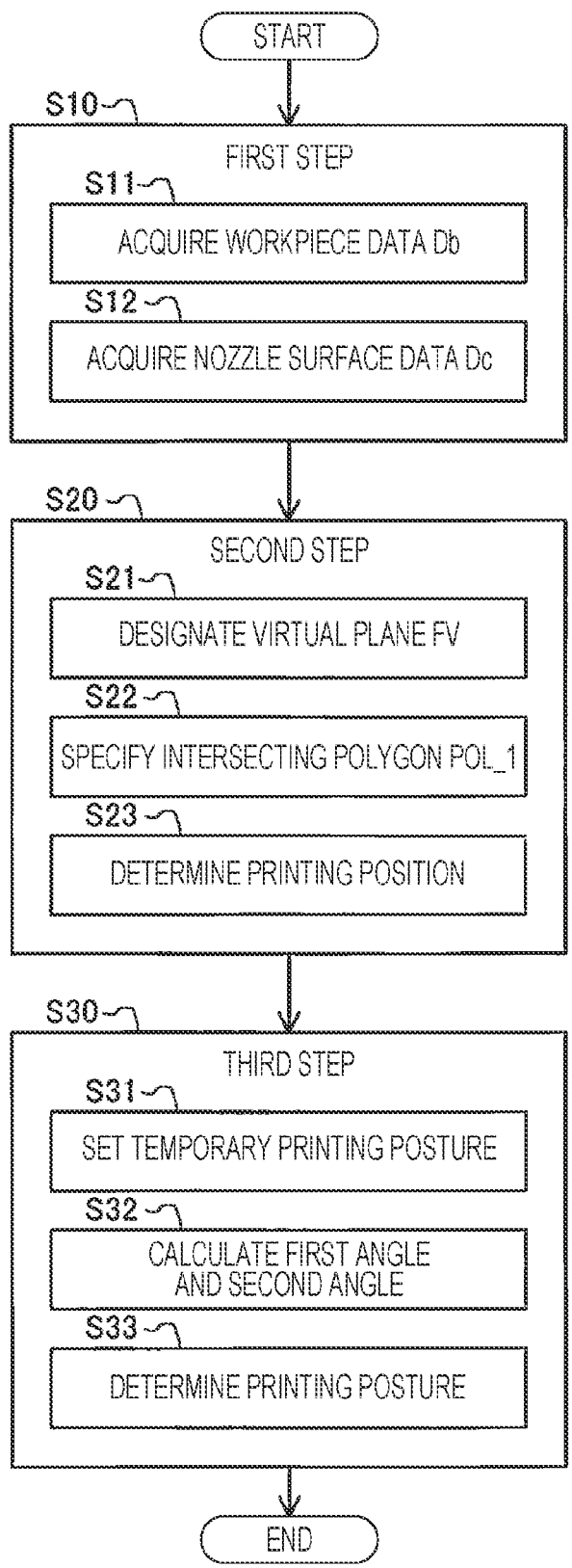
FIG. 5 is a flowchart illustrating a robot teaching method according to the embodiment.

FIG. 5 is a flowchart illustrating a teaching method for the robot 2 according to the embodiment. The teaching method will be described below using the three-dimensional object printer 1 described above as an example. The teaching method is performed using the computer 7. Here, the generator 7b1 uses the teaching method to generate the print path information Da.

As illustrated in FIG. 5, the teaching method includes a first step S10, a second step S20, and a third step S30, which are executed in this order.

The first step S10 is an example of a data acquisition step where the storage circuit 7a acquires the workpiece data Db and the nozzle surface data Dc. In the example illustrated in FIG. 5, the first step S10 includes step S11 of acquiring the workpiece data Db and step S12 of acquiring the nozzle surface data Dc. Note that step S11 may be performed before the second step S20, and may be performed between step S12 and the second step S20, for example. Moreover, step S12 may be performed before the third step S30, and may be performed between the second step S20 and the third step S30, for example. That is, the second step S20 may be performed between steps S11 and S12.

The second step S20 is an example of a printing position setting step where the processing circuit 7b sets the printing position indicated by the position data Da1 based on the workpiece data Db. The position data Da1 is generated by this setting. In the example illustrated in FIG. 5, the second step S20 includes, in this order, step S21 of specifying a virtual plane FV, step S22 of specifying a plurality of intersecting polygons POL_1, and step S23 of determining the printing position.

The third step S30 is an example of a printing posture setting step. The printing posture is a concept that indicates the posture of the head 3a with respect to the workpiece W during the printing operation. In the third step S30, the posture of the robot 2 in the printing operation is set by setting the printing posture based on the workpiece data Db and the nozzle surface data Dc. To be more specific, in the third step S30, the processing circuit 7b sets the printing posture indicated by the posture data Da2. The posture data Da2 is generated by this setting. In the example illustrated in FIG. 5, the third step S30 includes, in this order, step S31 of setting a temporary printing posture, step S32 of calculating a first angle $\theta 1$ and a second angle $\theta 2$, and step S33 of determining the printing posture. The first angle $\theta 1$ is first angles $\theta 1a$ and $\theta 1b$ to be described later. The second angle $\theta 2$ is second angles $\theta 2a$ and $\theta 2b$ to be described later.

The print path information Da is generated by executing the first step S10, the second step S20, and the third step S30 described above. The respective steps illustrated in FIG. 5 will be sequentially described in detail below.

1-5-1. First Step

Figure 6:
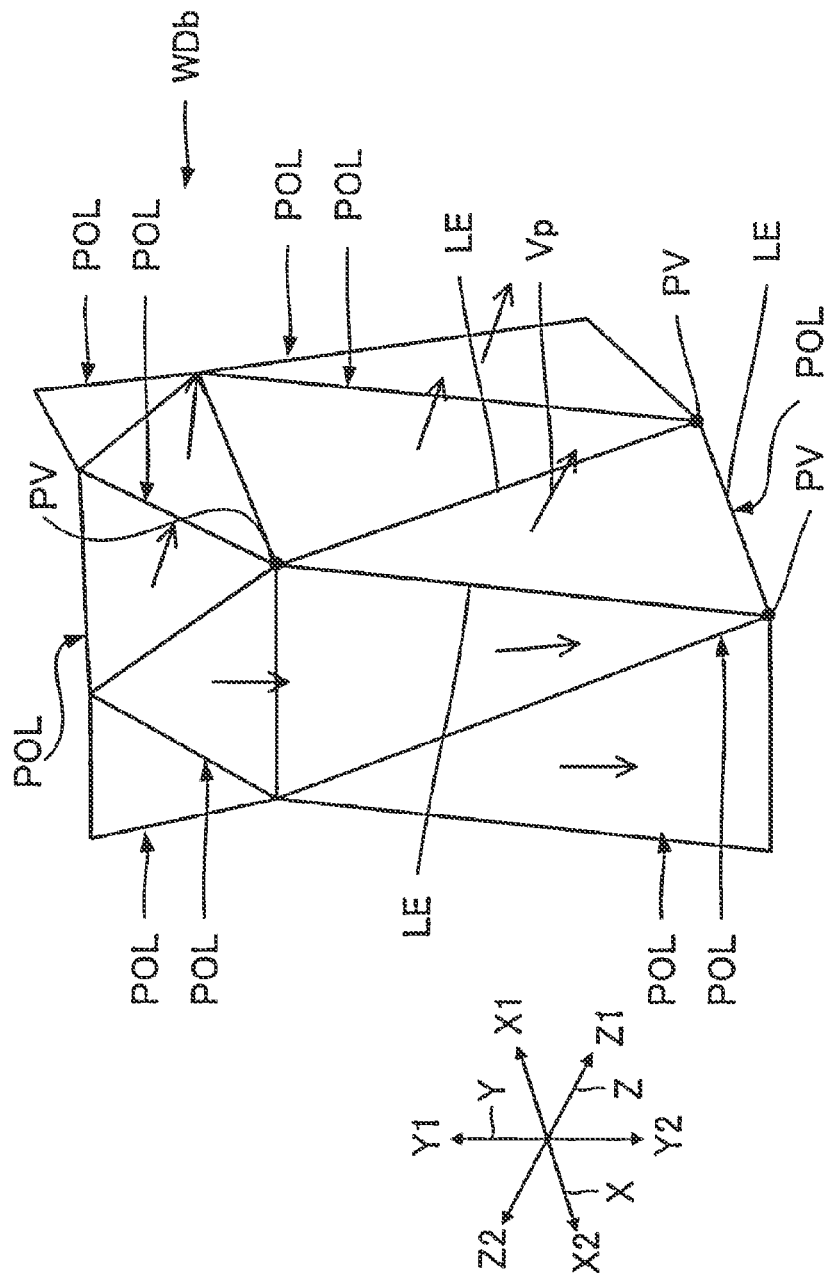
FIG. 6 is a diagram for explaining acquisition of workpiece data in a first step.

FIG. 6 is a diagram for explaining acquisition of the workpiece data Db in the first step S10. In step S11 of the first step S10, the workpiece data Db is acquired. This acquisition is performed by the generator 7b1 reading the workpiece data Db from the storage circuit 7a. FIG. 6 representatively illustrates a part of a surface WDb indicated by the workpiece data Db. The surface WDb corresponds to the surface WF of the workpiece W. In the example illustrated in FIG. 6, the surface WDb is illustrated in the base coordinate system or the robot coordinate system for convenience of explanation from the viewpoint of clarity. Note that the surface WDb may be expressed in the workpiece coordinate system.

The surface WDb includes a plurality of polygons POL. In the example illustrated in FIG. 6, each polygon POL forms a triangle with three sides LE and three vertices PV. Here, each side LE is shared by two polygons POL. Two polygons POL sharing one side LE are adjacent to each other with the one side LE as a boundary. Also, each vertex PV is shared by three or more polygons POL. Three or more polygons POL sharing one vertex PV contact each other with the one vertex PV as a point of contact. In FIG. 6, a normal vector Vp of each polygon POL is illustrated for convenience of explanation. The normal vector Vp is represented by vector information Db2. The shape of each polygon POL is not limited to a triangle but may be another polygon such as a quadrangle.

Although not illustrated, in step S12 of the first step S10, the nozzle surface data Dc is acquired. This acquisition is performed by the generator 7b1 reading the nozzle surface data Dc from the storage circuit 7a.

1-5-2. Second Step

Figure 7:
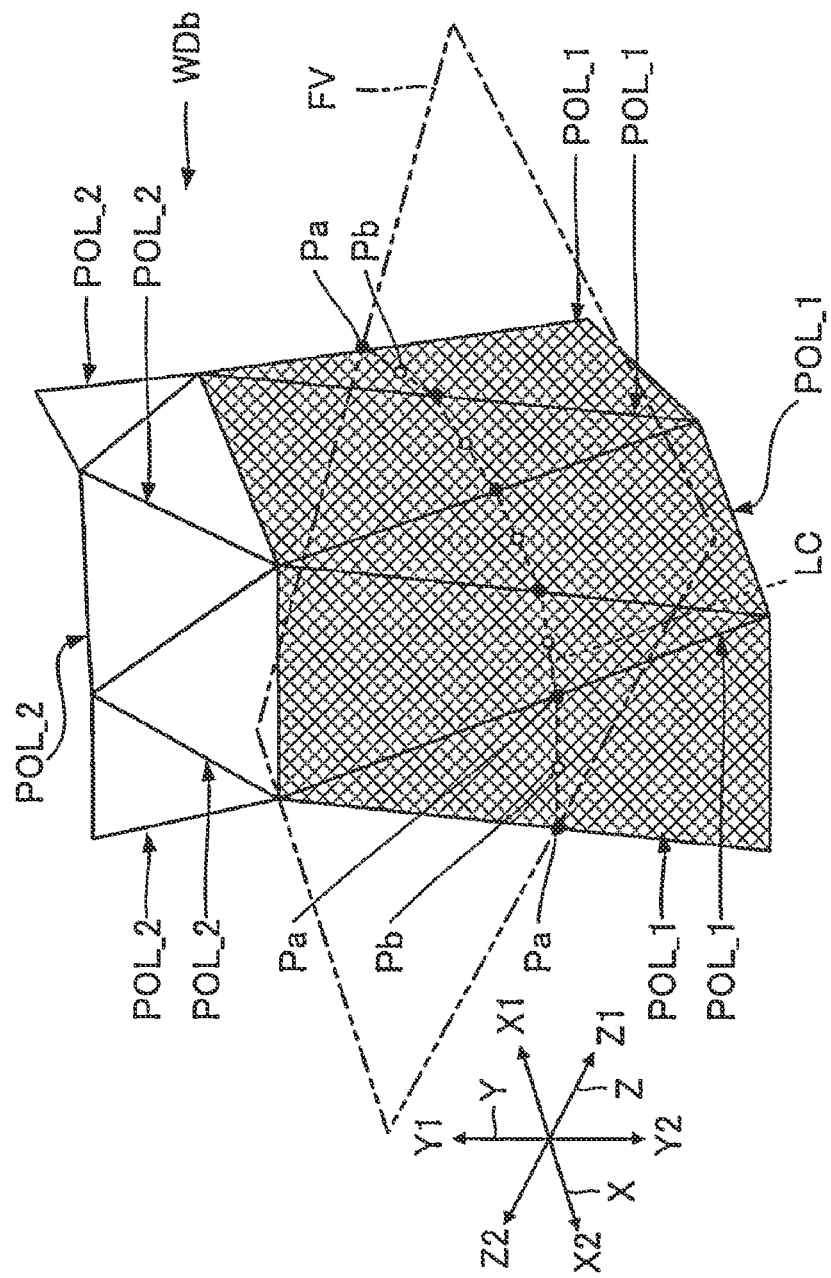
FIG. 7 is a diagram for explaining setting of a printing position in a second step.

FIG. 7 is a diagram for explaining the printing position setting in the second step S20. In step S21 of the second step S20, the virtual plane FV represented by the same coordinate system as the workpiece data Db is designated in a virtual space that virtually represents a reality space. The virtual plane FV crosses the surface WDb. The virtual plane FV and the surface WDb intersect each other at a line intersection LC.

The designation of the virtual plane FV is performed by the generator 7b1 based on the printing position information set by the user. The printing position information is information regarding one or both of the position and posture on the surface of the workpiece W desired by the user during printing, and is set by the user's input to the computer 7. For example, the user inputs the printing position information using the input device of the computer 7, so that one or both of the position and posture of the print image on the surface of the workpiece W by the three-dimensional object printer 1 can be appropriately adjusted in the virtual space. More specifically, on an image corresponding to the workpiece W displayed based on the workpiece data Db, the user can input the printing position information by setting the position according to cursor movement or the like by mouse operation or adjusting the posture by mouse operation such as so-called drag-and-drop.

The generator 7b1 designates the virtual plane FV according to the printing position information. Here, the virtual plane FV is preferably designated so as to be as parallel as possible to the normal line of the intersecting polygon POL. The intersecting polygon POL_1 is to be described later. For example, as illustrated in FIG. 7, when there are five intersecting polygons POL, the virtual plane FV is designated so as to minimize the sum or average of the differences between the angle formed by each polygon POL and the virtual plane FV and 90°.

Here, the virtual plane FV is a plane that roughly represents an ideal ink discharge direction by the head 3a and an ideal movement direction of the head 3a. That is, during execution of the printing operation, the head 3a discharges ink substantially parallel to the virtual plane FV, and the head 3a moves in a direction substantially parallel to the virtual plane FV. Thus, the virtual plane FV is a reference plane for defining the position and posture of the head 3a during printing.

In step S22 of the second step S20, a plurality of intersecting polygons POL_1, which are polygons POL intersecting the virtual plane FV among the plurality of polygons POL, are specified in the virtual space. Since the virtual plane FV crosses the surface WDb as described above, the plurality of polygons POL forming the surface WDb are divided into a plurality of intersecting polygons POL_1 that intersect the virtual plane FV and a plurality of polygons POL_2 that do not intersect the virtual plane FV. In FIG. 7, the intersecting polygons POL_1 are shaded for convenience of explanation.

In step S23 of the second step S20, the printing position indicated by the position data Da1 is set in the virtual space based on the plurality of intersecting polygons POL_1. To be more specific, in step S23, the printing position indicated by the position data Da1 is set based on a plurality of intersection points Pa between the sides LE of the plurality of intersecting polygons POL_1 and the virtual plane FV.

In the example illustrated in FIG. 7, the plurality of intersection points Pa are interpolated by interpolation points Pb. A plurality of points including the plurality of intersection points Pa and the plurality of interpolation points Pb are set as printing positions indicated by the position data Da1. Thus, the printing position indicated by the position data Da1 is set based on the plurality of intersection points Pa and the plurality of interpolation points Pb. In the example illustrated in FIG. 7, the number of interpolation points Pb arranged between two adjacent intersection points Pa is one, but may be two or more. A plurality of points including the plurality of intersection points Pa and the plurality of interpolation points Pb need not be equally spaced apart.

The position data Da1 may be based on at least one of the plurality of intersection points Pa and the plurality of interpolation points Pb, and the printing positions indicated by the position data Da1 do not have to match the positions of the plurality of intersection points Pa and the plurality of interpolation points Pb. For example, in order to prevent collision between the head 3a and the workpiece W by separating them during printing, the printing positions indicated by the position data Da1 may be set by moving the positions of the plurality of intersection points Pa and the plurality of interpolation points Pb in a direction of uniformly separating from the intersecting polygons POL_1. In this case, the tool center point TCP of the robot 2 is arranged at a position or the like on the nozzle surface FN of the head 3a.

In the example illustrated in FIG. 7, the interpolation points Pb are arranged on the intersection line LC. A plurality of points including the plurality of intersection points Pa and the plurality of interpolation points Pb are typically arranged so as to be spaced apart as equally as possible. Here, it is preferable that the interpolation points Pb are arranged on a smooth curve passing the plurality of intersection points Pa. Such a curve is represented by a spline function, for example. The printing position indicated by the position data Da1 may be set by interpolation between a plurality of valid intersection points after sorting the plurality of intersection points Pa into the plurality of valid intersection points and at least one invalid intersection point.

1-5-3. Third Step

Figure 8:
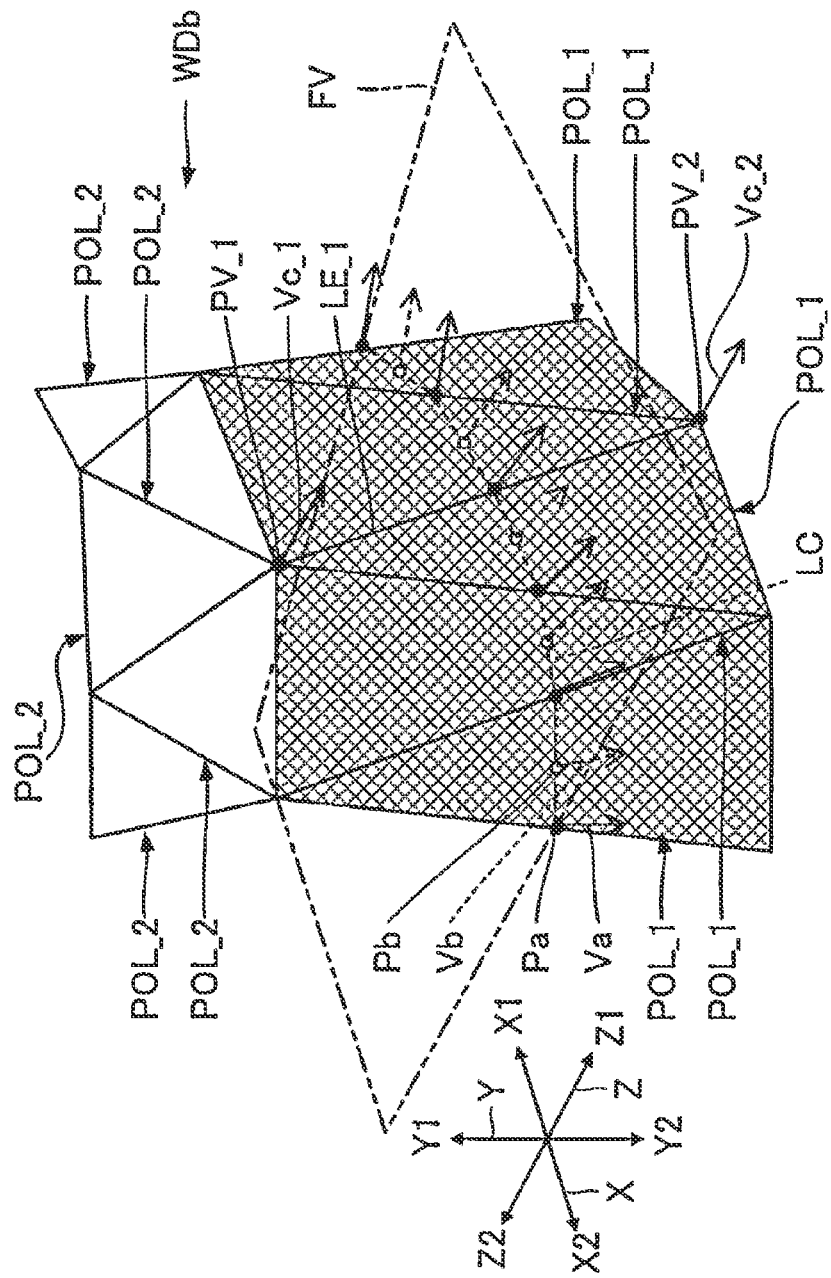
FIG. 8 is a diagram for explaining setting of a temporary printing posture in a third step.

FIG. 8 is a diagram for explaining the setting of a temporary printing posture in the third step S30. Here, the temporary printing posture is a concept that indicates a temporary posture of the head 3a with respect to the workpiece W in the printing operation, and is a temporary posture for the processing circuit 7b to determine the printing posture. Although will be described in detail later, the temporary printing posture set in step S31 of the third step S30 is adjusted to an appropriate printing posture through steps S32 and S33 to be described later. For example, in step S31 of the third step S30, the temporary printing posture is set in the virtual space based on the vector information Db2 of the workpiece data Db. To be more specific, in step S31, a plurality of intersection vectors Va indicating directions along the normal line corresponding to the intersection points Pa between the sides LE of the plurality of intersecting polygons POL_1 and the virtual plane FV are specified based on the vector information Db2. Then, in step S31, a temporary printing posture is set based on the plurality of intersection vectors Va. More specifically, in step S31, the processing circuit 7b sets the temporary printing posture so that the discharge direction DE of the head 3a or the c-axis of the head 3a is parallel to the plurality of intersection vectors Va.

In the example illustrated in FIG. 8, besides the intersection vectors Va, a plurality of interpolation point vectors Vb indicating directions along the normal line corresponding to the interpolation points Pb are specified. That is, the plurality of intersection vectors Va are interpolated by the interpolation point vectors Vb. Then, a posture based on the intersection vector Va or the interpolation point vector Vb of each of the plurality of intersection points Pa and the plurality of interpolation points Pb is set as the temporary printing posture. Thus, the temporary printing posture is set based on the plurality of intersection vectors Va and interpolation point vectors Vb.

The intersection vector Va is preferably defined based on the normal vector Vp of the plurality of polygons POL sharing both ends of the side LE containing the corresponding intersection point Pa. To be more specific, assuming that one of the plurality of intersection points Pa is a first intersection point, the intersection vector Va indicating a direction along the normal line corresponding to the first intersection point is preferably defined based on a first vertex vector Vc_1 and a second vertex vector Vc_2. Here, assuming that the side LE containing the first intersection point among the sides LE of the plurality of intersecting polygons POL_1 is a first side LE_1, one end of the first side LE_1 is a first vertex PV_1, and the other end of the first side LE_1 is a second vertex PV_2, the first vertex vector Vc_1 is a normal vector corresponding to the first vertex PV_1 and the second vertex vector Vc_2 is a normal vector corresponding to the second vertex PV_2. These vertex vectors are preferably obtained in advance based on the vector information Db2 included in the workpiece data Db.

The interpolation point vector Vb is defined so as to be the average of two adjacent intersection vectors Va, for example.

Note that the temporary printing posture may be set by interpolation between the plurality of valid intersection vectors after sorting the plurality of intersection vectors Va into a plurality of valid intersection vectors and at least one invalid intersection vector.

As another example, in step S31, the processing circuit 7b can also determine the temporary printing posture based on the virtual plane FV and the like, instead of the intersection vector Va. More specifically, in step S31, the processing circuit 7b can also set the temporary printing posture so that the discharge direction DE of the head 3a or the c-axis of the head 3a is parallel to the virtual plane FV and that the nozzle array direction DN of the head 3a or the b-axis of the head 3a is perpendicular to the virtual plane FV.

Figure 9:
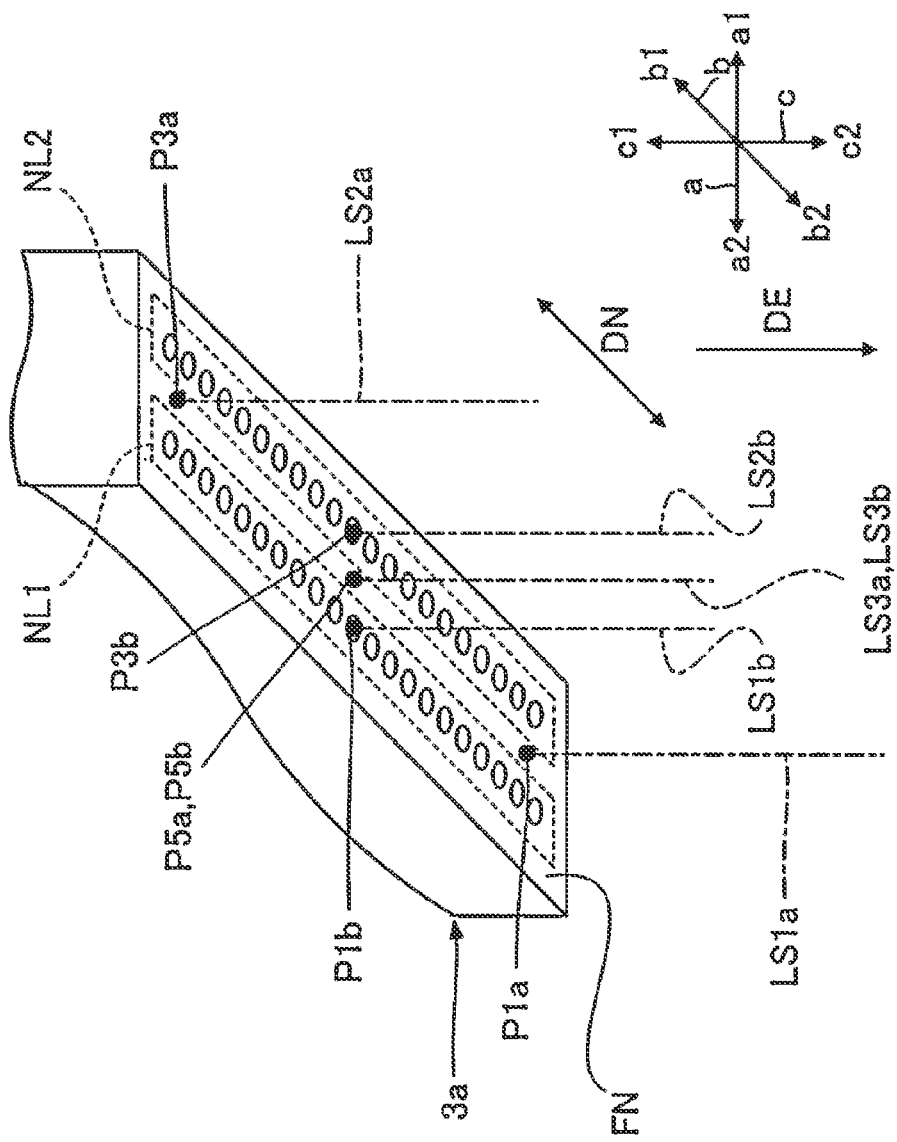
FIG. 9 is a diagram for explaining positions on a nozzle surface.

FIG. 9 is a diagram for explaining positions on the nozzle surface FN. In this embodiment, in the third step S30, a printing posture of the nozzle surface FN relative to the workpiece W around both the roll axis and the pitch axis is set.

A first position P1a, a third position P3a, and a fifth position P5a on the nozzle surface FN illustrated in FIG. 9 are used to set the printing posture around the roll axis. As will be described in detail later, the first position P1a, the fifth position P5a, and the third position P3a are arranged in this order in the nozzle array direction DN. FIG. 9 illustrates a first straight line LS1a, a second straight line LS2a, and a third straight line LS3a, which will be described later and correspond to the first position P1a, the third position P3a, and the fifth position P5a.

On the other hand, a first position P1b, a third position P3b, and a fifth position P5b on the nozzle surface FN illustrated in FIG. 9 are used to set the printing posture around the pitch axis. As will be described in detail later, the first position P1b, the fifth position P5b, and the third position P3b are arranged in this order in a direction orthogonal to the nozzle array direction DN. In the example illustrated in FIG. 9, the fifth position P5a coincides with the fifth position P5b. FIG. 9 illustrates a first straight line LS1b, a second straight line LS2b, and a third straight line LS3b, which will be described later and correspond to the first position P1b, the third position P3b, and the fifth position P5b.

FIG. 9 illustrates the example where the first positions P1a and P1b, the third positions P3a and P3b, and the fifth positions P5a and P5b are all located on the nozzle surface FN, but the present disclosure is not necessarily limited to this example. For example, the relative positional relationship between these positions and the nozzle surface FN may be constant regardless of the position and posture of the head 3a. In other words, the first positions P1a and P1b, the third positions P3a and P3b, and the fifth positions P5a and P5b may be fixed in positional relationship with the nozzle surface FN. For example, these positions may be offset in the discharge direction DE with respect to the nozzle surface FN, but preferably within a range overlapping with the nozzle surface FN when viewed along the discharge direction DE.

Figure 10:
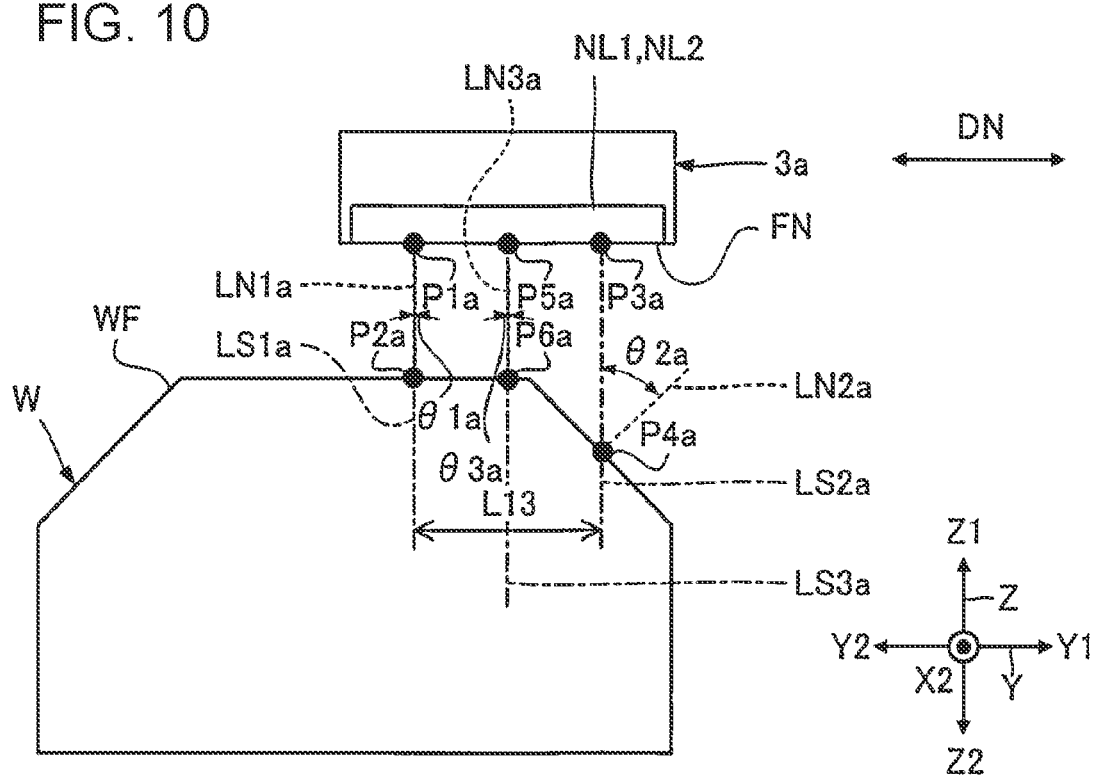
FIG. 10 is a diagram for explaining a first angle and a second angle of the temporary printing posture around a roll axis in the third step.

FIG. 10 is a diagram for explaining the first angle θ1a and the second angle θ2a regarding the temporary printing posture around the roll axis in the third step S30. The roll axis is parallel to the a-axis illustrated in FIG. 3 described above and preferably passes through the tool center point TCP. FIG. 10 illustrates the workpiece W and the head 3a viewed in a direction parallel to the nozzle surface FN and orthogonal to the nozzle array direction DN. FIG. 10 schematically illustrates the workpiece W and the head 3a for convenience of explanation.

In step S32, first, N positions on the nozzle surface FN in the temporary printing posture are set in the virtual space. N is a natural number of 2 or more. This setting is performed for each of the plurality of intersection points Pa and the plurality of interpolation points Pb, for example.

Figure 12:
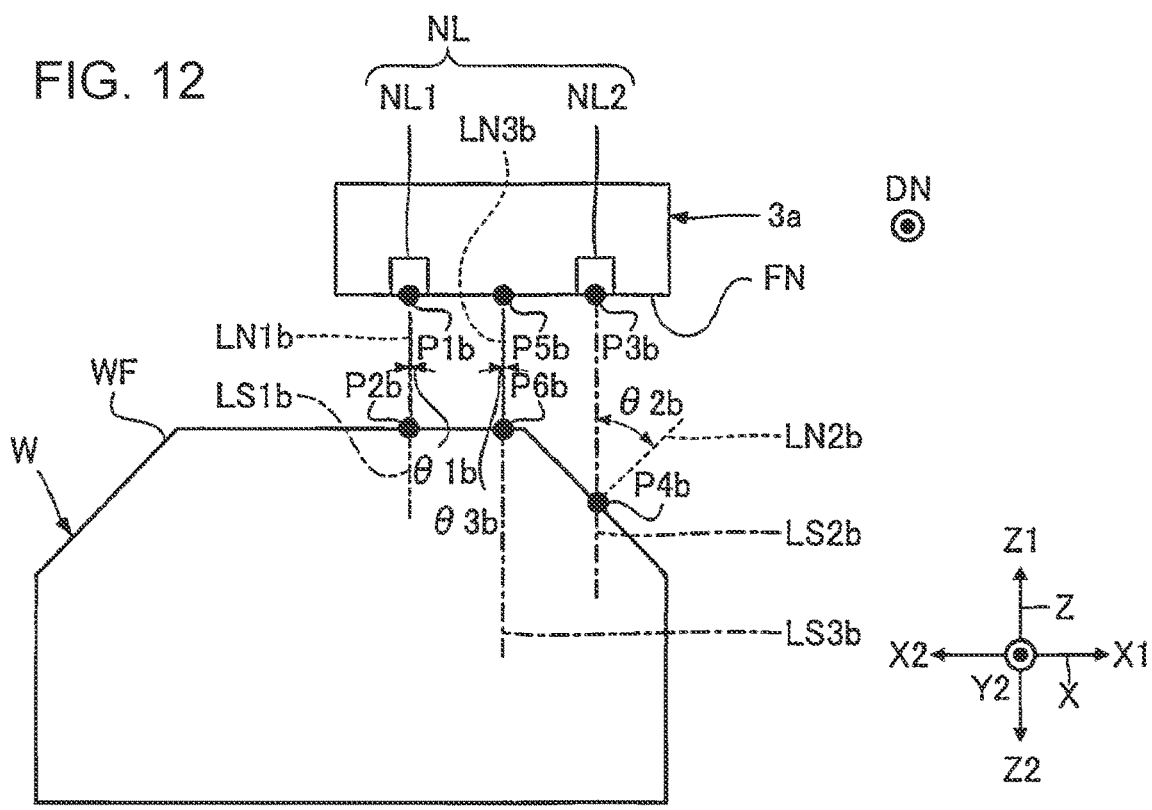
FIG. 12 is a diagram for explaining a first angle and a second angle of the temporary printing posture around a pitch axis in the third step.

In the example illustrated in FIG. 10, as for the printing posture of the head 3a around the roll axis, three positions on the nozzle surface FN in the temporary printing posture are set as the first position P1a, the third position P3a, and the fifth position P5a, which are arranged in the nozzle array direction DN. As will be described in detail later, in this embodiment, N is 6, and in addition to the first position P1a, the third position P3a, and the fifth position P5a illustrated in FIG. 10, a first position P1b, a third position P3b, and a fifth position P5b illustrated in FIG. 12 are set as positions on the nozzle surface FN in the temporary printing posture. Note that N may be 2 to 5, or may be 7 or more. However, N is preferably 2 or more, and more preferably 3 or more, from the viewpoint of optimum setting of the printing posture. Here, when N is 3 or more, it is preferable that the positions are different in a direction along the X-axis between two of the three points and that the positions are different in a direction along the Y-axis between two of the three points. Also, the fifth position P5a illustrated in FIG. 10 and the fifth position P5b illustrated in FIG. 12 may be different or common.

Here, the first and third positions P1a and P3a in FIG. 10 are different from each other in the nozzle array direction DN. The fifth position P5a in FIG. 10 is located between the first and third positions P1a and P3a. It is preferable that, in the nozzle array direction DN of FIG. 10, the center of the nozzle array NL is located between the first and third positions P1a and P3a, and the fifth position P5a is at or near the center of the nozzle array NL.

When a printing width is variable in the nozzle array direction DN during execution of the printing operation, a distance L13 between the first and third positions P1a and P3a is preferably set so as to become shorter as the printing width becomes smaller. It can be said that, in one nozzle array NL, the larger the number of nozzles N that discharge ink, the larger the printing width, and the smaller the number of nozzles N that discharge ink, the smaller the printing width. The printing width is a value that can be determined by the processing circuit 7b based on the print data Img, and that can change depending on the size of an image printed on the workpiece W by the three-dimensional object printer 1. Thus, when the printing width is variable, there is an advantage that the image quality can be easily improved by adjusting the printing posture to be described later, compared to a case where the distance L13 is fixed. More specifically, when the printing operation includes a first width printing operation in which the printing width in the nozzle array direction DN is a first width and a second width printing operation in which the printing width in the nozzle array direction DN is a second width narrower than the first width, the printing posture setting step is executed by dividing the step into a first printing posture setting step for setting a printing posture in the first width printing operation and a second printing posture setting step for setting a printing posture in the second width printing operation. Here, it is preferable that the distance between the first and third positions P1a and P3a in the second printing posture setting step is set shorter than the distance between the first and third positions P1a and P3a in the first printing posture setting step.

After setting the first position P1a, the third position P3a, and the fifth position P5a, a straight line extending from the first position P1a toward the workpiece W in the direction normal to the nozzle surface FN or in the discharge direction is set as the first straight line LS1a. Similarly, a straight line extending from the third position P3a toward the workpiece W in the direction normal to the nozzle surface FN or in the discharge direction is set as the second straight line LS2a. Also, a straight line extending from the fifth position P5a toward the workpiece W in the direction normal to the nozzle surface FN or in the discharge direction is set as the third straight line LS3a.

After setting the first straight line LS1a, the second straight line LS2a, and the third straight line LS3a, the intersection point of the first straight line LS1a and the surface WF of the workpiece W is set as the second position P2a. Likewise, the intersection point of the second straight line LS2a and the surface WF of the workpiece W is set as the fourth position P4a. Also, the intersection point of the third straight line LS3a and the surface WF of the workpiece W is set as a sixth position P6a. Here, the sixth position P6a is preferably the tool center point TPC or its vicinity.

After setting the second position P2a, the fourth position P4a, and the sixth position P6a, the normal line of the surface WF of the workpiece W at the second position P2a is set as a first normal line LN1a. Likewise, the normal line of the surface WF of the workpiece W at the fourth position P4a is set as a second normal line LN2a. Also, the normal line of the surface WF of the workpiece W at the sixth position P6a is set as a third normal line LN3a.

After setting the first normal line LN1a, the second normal line LN2a, and the third normal line LN3a, the angle formed by the first straight line LS1a and the first normal line LN1a is set as the first angle θ1a. Likewise, the angle formed by the second straight line LS2a and the second normal line LN2a is set as the second angle θ2a. Also, the angle formed by the third straight line LS3a and the third normal line LN3a is set as a third angle θ3a.

As illustrated in FIG. 10, the first angle θ1a, the second angle θ2a, and the third angle θ3a vary greatly with the head 3a in the temporary printing posture. In the example illustrated in FIG. 10, the first and third angles θ1a and θ3a are 0°, whereas the second angle θ2a is extremely larger than the first angle θ1a or the third angle θ3a. Therefore, the difference between each of the first and third angles θ1a and θ3a and the second angle θ2a is extremely large.

When the printing operation is executed in a state where the first angle θ1a, the second angle θ2a, and the third angle θ3a obtained in step S32 vary greatly, a large difference in ink landing angle between the nozzle arrays leads to deterioration in image quality. Therefore, in order to solve this problem, adjustment is made in step S33 to achieve an appropriate printing posture.

Figure 11:
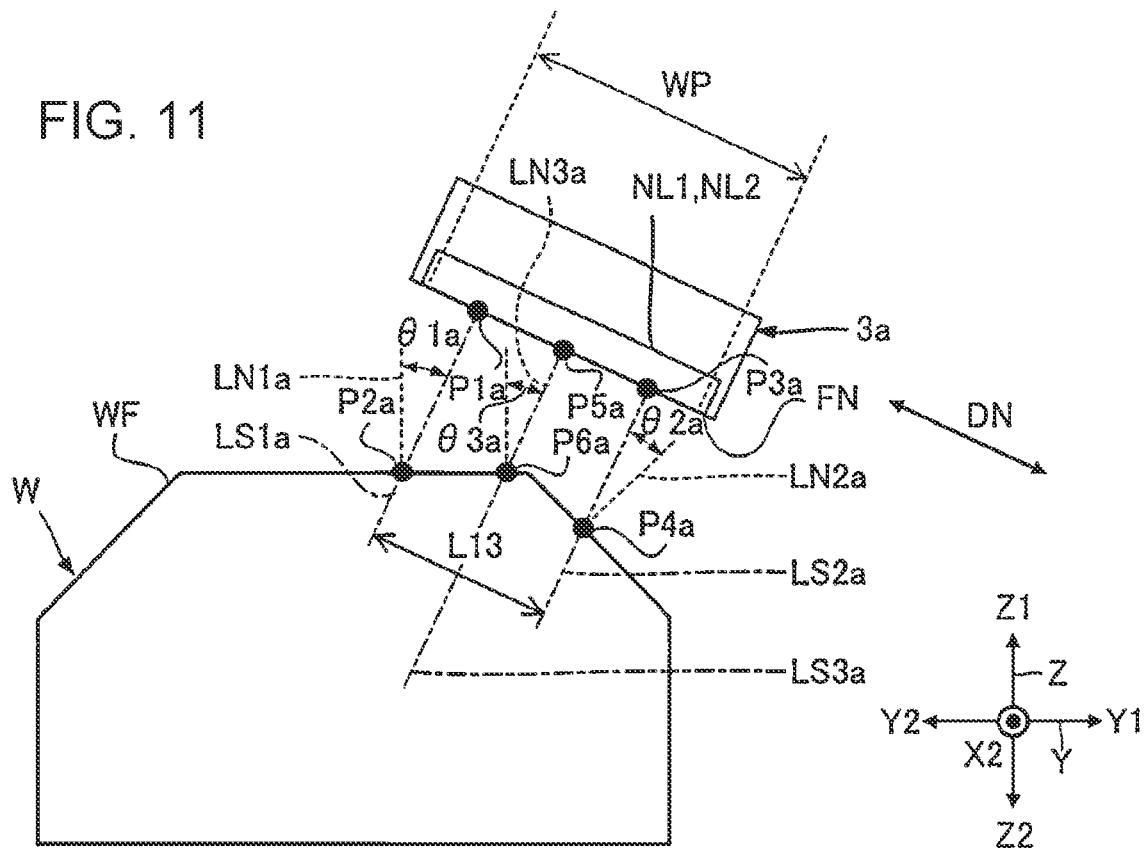
FIG. 11 is a diagram for explaining determination of the printing posture around the roll axis in the third step.

FIG. 11 is a diagram for explaining the determination of the printing posture around the roll axis in the third step S30. As in FIG. 10, FIG. 11 illustrates the workpiece W and the head 3a in a direction parallel to the nozzle surface FN and orthogonal to the nozzle array direction DN. As in FIG. 10, FIG. 11 schematically illustrates the workpiece W and the head 3a for convenience of explanation.

In step S33, the printing posture is set based on the first and second angles θ1a and θ2a in the virtual space. In the example illustrated in FIG. 11, the printing posture around the roll axis of the head 3a is adjusted based on the temporary printing posture so that the difference between the first and second angles θ1a and θ2a is reduced. This adjustment determines the printing posture of the head 3a around the roll axis.

In the example illustrated in FIG. 11, the third angle θ3a is used, besides the first and second angles θ1a and θ2a, to adjust the printing posture so as to minimize the difference between the third angle θ3a and the first angle θ1a and the difference between the third angle θ3a and the second angle θ2a. More specifically, the printing posture is adjusted so as to reduce the standard deviation of the first angle θ1a, the second angle θ2a, and the third angle θ3a. Also, it is preferable to adjust the printing posture so as to minimize the differences among the first angle θ1a, the second angle θ2a, and the third angle θ3a. Prior to determining the printing posture around the roll axis, the processing circuit 7b alternately repeats the adjustment of the printing posture and the calculation of the standard deviation of each angle, thus making it possible to adjust the printing posture so as to reduce the standard deviation.

Here, it is preferable that the adjustment of the printing posture is performed by rotation about the tool center point TCP from the viewpoint of reducing the deviation of the ink landing position due to the adjustment. That is, in the example illustrated in FIG. 11, it is preferable to adjust the printing posture by rotation about the roll axis passing through the tool center point TCP.

As described above, in step S33, the printing posture of the head 3a around the roll axis is determined.

FIG. 12 is a diagram for explaining the first angle θ1b and the second angle θ2b regarding the temporary printing posture around the pitch axis in the third step S30. The pitch axis is parallel to the b-axis illustrated in FIG. 3 described above and preferably passes through the tool center point TCP. FIG. 12 illustrates the workpiece W and the head 3a viewed in the nozzle array direction DN. FIG. 12 schematically illustrates the workpiece W and the head 3a for convenience of explanation.

In step S32, first, as described above, besides the first position P1a, the third position P3a, and the fifth position P5a illustrated in FIG. 10, the first position P1b, the third position P3b, and the fifth position P5b illustrated in FIG. 12 are set in the virtual space as the positions on the nozzle surface FN in the temporary printing posture. In the example illustrated in FIG. 12, as for the printing posture around the pitch axis of the head 3a, the first position P1b, the third position P3b, and the fifth position P5b are set as the positions on the nozzle surface FN in the temporary printing posture.

In the example illustrated in FIG. 12, three positions on the nozzle surface FN in the temporary printing posture are set as the first position P1b, the third position P3b, and the fifth position P5b arranged in a direction orthogonal to the nozzle array direction DN along the nozzle surface FN. Note that the fifth position P5a illustrated in FIG. 10 and the fifth position P5b illustrated in FIG. 12 may be different or common.

Here, the first position P1b and the third position P3b are different from each other in the direction orthogonal to the nozzle array direction DN. The fifth position P5b is different from the first position P1b and the third position P3b in the direction orthogonal to the nozzle array direction DN. More specifically, the fifth position P5b is located between the first position P1b and the third position P3b.

The first position P1b is closer to the first nozzle array NL1 than to the second nozzle array NL2. On the other hand, the third position P3b is closer to the second nozzle array NL2 than to the first nozzle array NL1. In the example illustrated in FIG. 12, the first position P1b is the position of the first nozzle array NL1 in the direction orthogonal to the nozzle array direction DN, and the third position P3b is the position of the second nozzle array NL2 in the direction orthogonal to the nozzle array direction DN.

After setting the first position P1b, the third position P3b, and the fifth position P5b, a first straight line LS1b, a second straight line LS2b, a third straight line LS3b, a second position P2b, a fourth position P4b, a sixth position P6b, a first normal line LN1b, a second normal line LN2b, a third normal line LN3b, a first angle θ1b, a second angle θ2b, and a third angle θ3b are set as described above with reference to FIG. 10.

Figure 13:
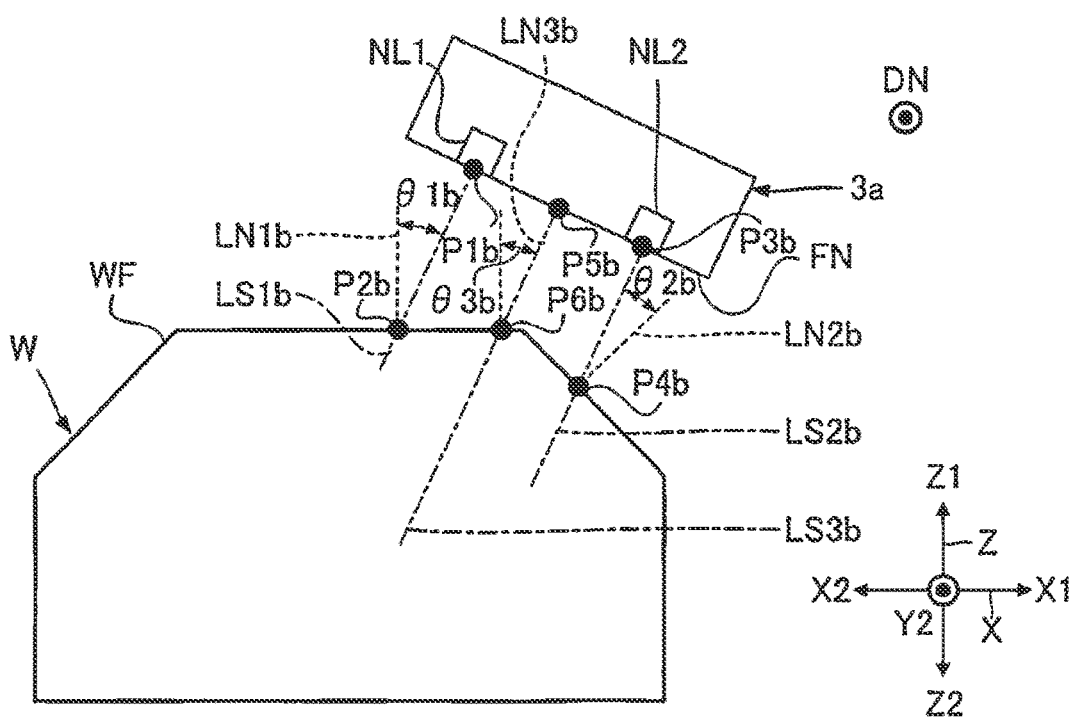
FIG. 13 is a diagram for explaining determination of the printing posture around the pitch axis in the third step.

FIG. 13 is a diagram for explaining the determination of the printing posture around the pitch axis in the third step S30. As in FIG. 12, FIG. 13 illustrates the workpiece W and the head 3a viewed in the nozzle array direction DN. As in FIG. 12, FIG. 13 schematically illustrates the workpiece W and the head 3a for convenience of explanation.

In the example illustrated in FIG. 13, the printing posture around the pitch axis of the head 3a is adjusted based on the temporary printing posture so that a difference between the first and second angles θ1b and θ2b is reduced. This adjustment determines the printing posture of the head 3a around the pitch axis.

In the example illustrated in FIG. 13, the third angle θ3b is used, besides the first and second angles θ1b and θ2b, to adjust the printing posture so as to minimize the difference between the third angle θ1b and the third angle θ3b and the difference between the second angle θ2b and the third angle θ3b. More specifically, the printing posture is adjusted so as to reduce the standard deviation of the first angle θ1b, the second angle θ2b, and the third angle θ3b. Also, it is preferable to adjust the printing posture so as to minimize the differences among the first angle θ1b, the second angle θ2b, and the third angle θ3b. Prior to determining the printing posture around the pitch axis, the processing circuit 7b alternately repeats the adjustment of the printing posture and the calculation of the standard deviation of each angle, thus making it possible to adjust the printing posture so as to reduce the standard deviation.

Here, it is preferable that the adjustment of the printing posture is performed by rotation about the tool center point TCP from the viewpoint of reducing the deviation of the ink landing position due to the adjustment. That is, in the example illustrated in FIG. 13, it is preferable to adjust the printing posture by rotation about the pitch axis passing through the tool center point TCP.

Thus, the printing posture of the head 3a around the pitch axis is determined. In this embodiment, the printing postures of the nozzle surface FN around both the roll axis and the pitch axis with respect to the workpiece W are set in the third step S30. However, the third step S30 is not limited to this embodiment. For example, only the printing posture of the nozzle surface FN around the roll axis relative to the workpiece W or only the printing posture of the nozzle surface FN around the pitch axis relative to the workpiece W may be set.

Figure 14:
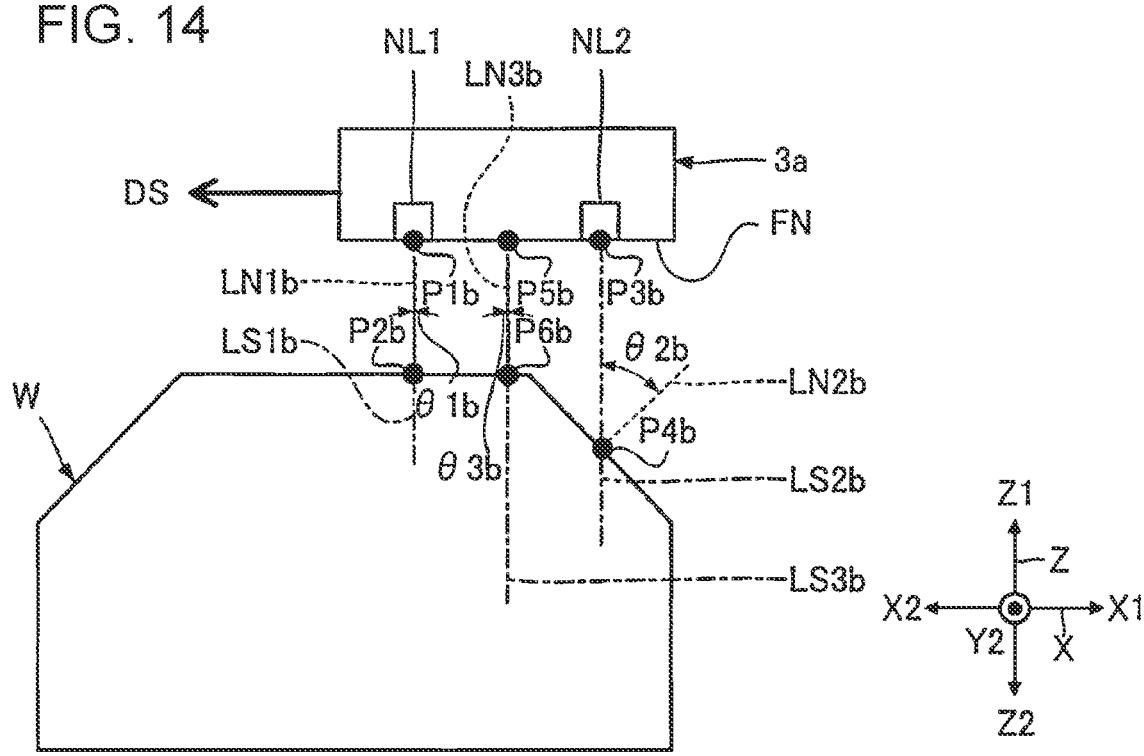
FIG. 14 is a diagram for explaining movement of a head during execution of a first printing operation.

FIG. 14 is a diagram for explaining the movement of the head 3a during execution of the first printing operation. The first printing operation is a printing operation in which ink is discharged onto the workpiece W from the first nozzle array NL1 and no ink is discharged from the second nozzle array NL2. When executing the first printing operation, a relative posture between the head 3a and the workpiece W is set in step S33 based on the first angle θ1b and not based on the second angle θ2b. For example, the first printing operation is executed using the temporary printing posture described above as the printing posture.

By setting the printing posture of the head 3a in the first printing operation as described above, the ink landing angle from the first nozzle array NL1 onto the workpiece W can be brought closer to 90° compared to an example illustrated in FIG. 15 to be described later. As a result, printing image quality can be improved using the first nozzle array NL1 only.

Figure 15:
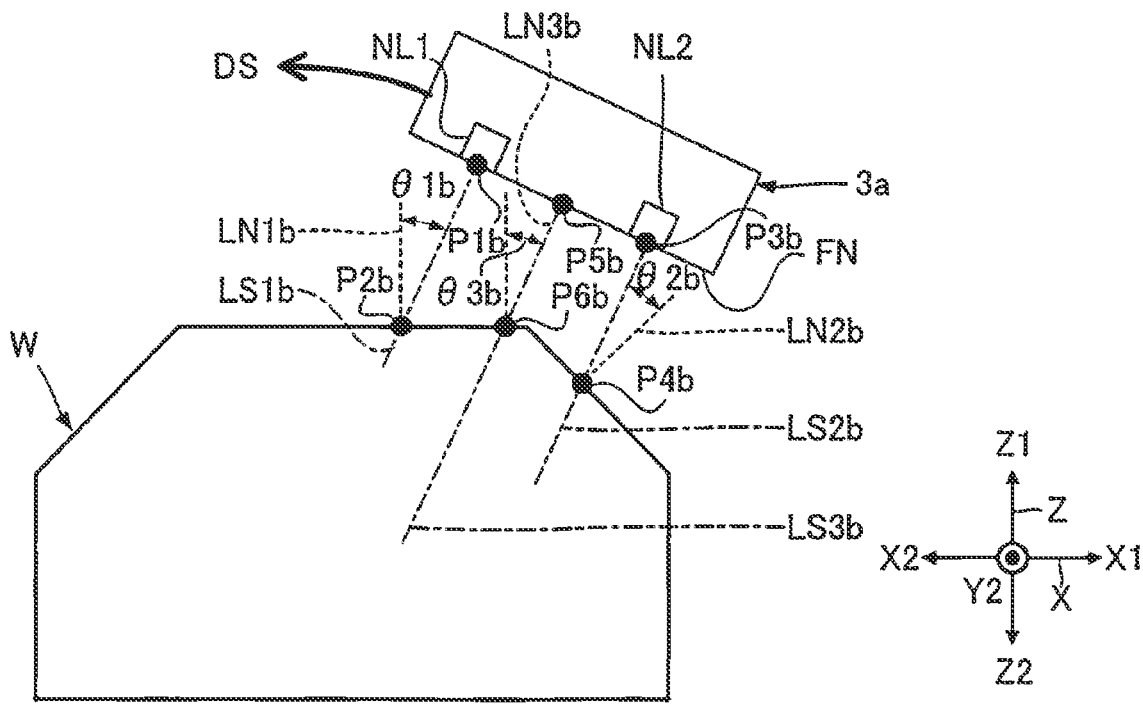
FIG. 15 is a diagram for explaining movement of the head during execution of a second printing operation.

FIG. 15 is a diagram for explaining the movement of the head 3a during execution of the second printing operation. The second printing operation is a printing operation in which ink is discharged onto the workpiece W from both of the first and second nozzle arrays NL1 and NL2. When executing the second printing operation, a relative posture between the head 3a and the workpiece W is set based on the first and second angles θ1b and θ2b. For example, the second printing operation is performed using the printing posture determined in step S33 described above.

By setting the printing posture of the head 3a in the second printing operation as described above, a difference between the ink landing angle from the first nozzle array NL1 onto the workpiece W and the ink landing angle from the second nozzle array NL2 onto the workpiece W can be reduced compared to the example illustrated in FIG. 14. As a result, the printing image quality can be improved using the first and second nozzle arrays NL1 and NL2.

As described above, the position and posture indicated by the print path information Da are set. Thereafter, the direction of relative movement between the head 3a and the workpiece W along the position indicated by the print path information Da is specified. In this embodiment, a direction separating from the robot 2 is set as the movement direction, out of one direction along the intersection line LC and a direction opposite thereto.

As described above, the teaching method for the robot 2 includes the first step S10, the second step S20, and the third step S30. Here, the robot 2 changes the relative position and posture between the three-dimensional workpiece W and the head 3a having the nozzle surface FN provided with the nozzle arrays NL including the plurality of nozzles N for discharging ink as an example of the "liquid".

As described above, in the first step S10, the workpiece data Db indicating at least part of the shape of the workpiece W and the nozzle surface data Dc indicating at least part of the shape of the nozzle surface FN are acquired. In the second step S20, the printing position is set based on the workpiece data Db, which is the relative position between the head 3a and the workpiece W during execution of a printing operation for applying ink discharged from the nozzles N onto the workpiece W. In the third step S30, the printing posture is set, which is the relative posture between the head 3a and the workpiece W at the printing position, based on the workpiece data Db and the nozzle surface data Dc.

Here, assuming that a straight line passing through the first position P1a on the nozzle surface FN and the second position P2a on the workpiece W is the first straight line LS1a, a normal line of the workpiece W at the second position P2a is the first normal line LN1a, an angle formed by the first straight line LS1a and the first normal line LN1a is the first angle $\theta 1a$, a straight line passing through the third position P3a different from the first position P1a on the nozzle surface FN and the fourth position P4a different from the second position P2a on the workpiece W is the second straight line LS2a, a normal line of the workpiece W at the fourth position P4a is the second normal line LN2a, and an angle formed by the second straight line LS2a and the second normal line LN2a is the second angle $\theta 2a$, the printing posture is set based on the first and second angles $\theta 1a$ and $\theta 2a$ in the third step S30.

Likewise, assuming that a straight line passing through the first position P1b on the nozzle surface FN and the second position P2b on the workpiece W is the first straight line LS1b, a normal line of the workpiece W at the second position P2b is the first normal line LN1b, an angle formed by the first straight line LS1b and the first normal line LN1b is the first angle $\theta 1b$, a straight line passing through the third position P3b different from the first position P1b on the nozzle surface FN and the fourth position P4b different from the second position P2b on the workpiece W is the second straight line LS2b, a normal line of the workpiece W at the fourth position P4b is the second normal line LN2b, and an angle formed by the second straight line LS2b and the second normal line LN2b is the second angle $\theta 2b$, the printing posture is set based on the first and second angles $\theta 1b$ and $\theta 2b$ in the third step S30.

In the teaching method described above, since the printing posture is set based on the first and second angles $\theta 1a$ and $\theta 2a$, the balance between the posture of the first position P1a with respect to the second position P2a and the posture of the third position P3a with respect to the fourth position P4a can be optimized so as to reduce the difference between the first and second angles $\theta 1a$ and $\theta 2a$. Likewise, since the printing posture is set based on the first and second angles $\theta 1b$ and $\theta 2b$, the balance between the posture of the first position P1b with respect to the second position P2b and the posture of the third position P3b with respect to the fourth position P4b can be optimized so as to reduce the difference between the first and second angles $\theta 1b$ and $\theta 2b$. Therefore, compared to a method of taking into account a posture only at one point on the nozzle surface FN with respect to one point on the workpiece W, the printing posture can be appropriately set.

As described above, when the direction along the nozzle array NL is set as the nozzle array direction DN, the first position P1a and the third position P3a are different from each other in the nozzle array direction DN. Therefore, the printing posture of the head 3a around the roll axis, which is scanned with respect to the workpiece W, can be appropriately set.

As described above, the center of the nozzle array NL is located between the first and third positions P1a and P3a in the nozzle array direction DN. Therefore, the printing postures at both ends of the nozzle array NL can be appropriately set.

As described above, when the printing operation includes the first width printing operation in which the printing width in the nozzle array direction DN is the first width and the second width printing operation in which the printing width in the nozzle array direction DN is the second width narrower than the first width, the printing posture setting step is executed by dividing the step into the first printing posture setting step for setting a printing posture in the first width printing operation and the second printing posture setting step for setting a printing posture in the second width printing operation. In this case, the distance between the first and third positions P1a and P3a in the second printing posture setting step is set shorter than the distance between the first and third positions P1a and P3a in the first printing posture setting step. Therefore, the printing posture of the head 3a can be appropriately set according to the printing width. For example, when the printing width is narrow, considering the printing posture at the position of the nozzles N that is not used to discharge ink may lead to a poor printing posture at the positions of the nozzles N used to discharge ink. Therefore, when the printing width is narrow, a poor printing posture can be prevented at the positions of the nozzles N used to discharge ink by reducing the distance between the first and third positions P1a and P3a. The poor printing posture means that the landing angle of ink droplets discharged from the nozzles N on the workpiece W becomes extremely shallow, for example, a state where the landing angle is 45 degrees or less.

As described above, assuming that a straight line passing through the fifth position P5a on the nozzle surface FN and the sixth position P6a on the workpiece W is the third straight line LS3a, a normal line of the workpiece W at the sixth position P6a is the third normal line LN3a, and the angle formed by the third straight line LS3a and the third normal line LN3a is the third angle $\theta 3a$, the printing posture is set based on the first angle θ1a, the second angle θ2a, and the third angle θ3a in the third step S30. Therefore, since the posture at the three points on the nozzle surface FN is taken into account, the printing posture of the head 3a can be set more appropriately compared to a method wherein only the posture at two points on the nozzle surface FN is taken into account. Likewise, assuming that a straight line passing through the fifth position P5b on the nozzle surface FN and the sixth position P6b on the workpiece W is the third straight line LS3b, a normal line of the workpiece W at the sixth position P6b is the third normal line LN3b, and the angle formed by the third straight line LS3b and the third normal line LN3b is the third angle θ3b, the printing posture is set based on the first angle θ1b, the second angle θ2b, and the third angle θ3b in the third step S30. In this respect, again, the printing posture of the head 3a can be set more appropriately.

As described above, the fifth position P5a is located between the first and third positions P1a and P3a. Therefore, the printing posture of the head 3a around the roll axis can be appropriately set by setting the center of the nozzle array NL in the nozzle array direction DN as the fifth position P5a, for example. Likewise, the fifth position P5b is located between the first and third positions P1b and P3b. Therefore, the printing posture of the head 3a around the pitch axis can be appropriately set by setting the center of the nozzle array NL in the direction orthogonal to the nozzle array direction DN as the fifth position P5b, for example.

As described above, when the direction along the nozzle array NL is the nozzle array direction DN, the fifth position P5b is different from the first and third positions P1b and P3b in the direction orthogonal to the nozzle array direction DN. Therefore, the printing posture of the head 3a around the pitch axis, which is scanned with respect to the workpiece W, can be appropriately set.

As described above, the nozzle array NL includes the first nozzle array NL1 and the second nozzle array NL2, which are arranged in the width direction. The first position P1b is closer to the first nozzle array NL1 than to the second nozzle array NL2. The third position P3b is closer to the second nozzle array NL2 than to the first nozzle array NL1. Therefore, the printing postures of the first and second nozzle arrays NL1 and NL2 can be appropriately set. That is, the printing posture of the head 3a around the pitch axis, which is scanned with respect to the workpiece W, can be appropriately set.

As described above, the tool center point TCP of the robot 2 is a position in the normal direction of the nozzle surface FN relative to the nozzle surface FN. In the third step S30, the printing posture is adjusted by rotation about the tool center point TCP. Therefore, compared to a case where the printing posture is adjusted by rotation about a position different from the tool center point TCP, deviation of the ink landing position due to the adjustment can be reduced.

As described above, the nozzle surface FN is provided with the first nozzle array NL1 and the second nozzle array NL2 as the N nozzle arrays, N being a natural number of 2 or more. In this embodiment, N is two. The first and second straight lines LS1b and LS2b are N straight lines extending in the normal direction of the nozzle surface FN from N positions provided so as to correspond to the N nozzle arrays NL on the nozzle surface FN, respectively. The first and second normal lines LN1b and LN2b are N normal lines of the workpiece W at N positions on the workpiece W that intersect the N straight lines. The first and second angles θ1b and θ2b are N angles formed by the N straight lines and the N normal lines. In the third step S30, the printing posture is set based on a plurality of angles, which are the first angle θ1b, the second angle θ2b, and the third angle θ3b, including the N angles. Therefore, the ink landing angle from each of the N nozzle arrays is taken into consideration. Thus, a difference in landing conditions between the nozzle arrays can be reduced. As a result, the image quality can be improved.

Here, as described above, in the third step S30, the printing posture is adjusted so as to reduce the standard deviation of the N angles. Therefore, the difference in landing conditions between the nozzle arrays is reduced.

In the teaching method for the robot 2 described above, the printing posture may be set in the third step S30 based on the length of a first line segment connecting the first and second positions P1a and P2a and the length of a second line segment connecting the third and fourth positions P3a and P4a, instead of the first and second angles θ1a and θ2a. In this case, again, by adjusting the printing posture so as to reduce a difference in length between the first and second line segments, the balance between the posture of the first position P1a with respect to the second position P2a and the posture of the third position P3a with respect to the fourth position P4a can be optimized. Therefore, compared to a method wherein only the posture at one point on the nozzle surface FN with respect to one point on the workpiece W is taken into account, the printing posture around the roll axis can be appropriately set. In addition to the lengths of the first and second line segments, the length of a third line segment connecting the fifth and sixth positions P5a and P6a may be taken into account. It is preferable that the first line segment, the second line segment, and the third line segment are all parallel to the c-axis. Moreover, the number of these line segments taken into account in adjusting the printing posture may be two or more and is not particularly limited. In the third step S30, the printing posture can also be adjusted and determined so as to reduce the standard deviation of these line segments.

Likewise, in the third step S30, the printing posture may be set based on the length of a first line segment connecting the first and second positions P1b and P2b and the length of a second line segment connecting the third and fourth positions P3b and P4b, instead of the first and second angles θ1b and θ2b. By adjusting the printing posture so as to reduce a difference in length between the first and second line segments, the balance between the posture of the first position P1b with respect to the second position P2b and the posture of the third position P3b with respect to the fourth position P4b can be optimized. Therefore, compared to a method wherein only the posture at one point on the nozzle surface FN with respect to one point on the workpiece W is taken into account, the printing posture around the pitch axis can be appropriately set. In this case, again, the number of these line segments taken into account in adjusting the printing posture may be two or more and is not particularly limited.

As described above, in the three-dimensional object printer 1 having the head 3a and the robot 2, when executing the first printing operation in which ink is discharged onto the workpiece W from the first nozzle array NL1 and no ink is discharged from the second nozzle array NL2, the relative posture between the head 3a and the workpiece W is set based on the first angle θ1b and not based on the second angle θ2b. On the other hand, when executing the second printing operation in which ink is discharged onto the workpiece W from both the first and second nozzle arrays NL1 and NL2, the relative posture between the head 3*a* and the workpiece W is set based on the first and second angles θ1*b* and θ2*b*.

In the three-dimensional object printer 1 described above, the number of positions considered for setting the printing posture of the head 3*a* is changed according to the number of nozzle arrays used. Therefore, the printing posture of the head 3*a* can be appropriately set according to the number of nozzle arrays used. For example, when using only a nozzle array for black ink, considering the printing posture at positions of nozzle arrays for other colors that are not used to discharge ink may lead to a poor printing posture at the position of the nozzle array used to discharge ink. Therefore, when the number of nozzle arrays used to discharge ink is small, such a poor printing posture at the position of the nozzle array used to discharge ink can be suppressed by reducing the number of positions to be considered for setting the printing posture of the head 3*a*.

2. MODIFIED EXAMPLES

The embodiments described above may be modified in various different ways. Specific modified examples that can be applied to the above embodiments will be illustrated below. It should be noted that any two or more embodiments selected from the following examples may be appropriately combined within a range that does not contradict each other.

2-1. Modified Example 1

In the above embodiments, the description is given of the configuration using the six-axis vertical multiaxis robot as the robot. However, the present disclosure is not limited to such a configuration. The robot may be, for example, a vertical multiaxis robot other than the 6-axis robot, or a horizontal multiaxis robot. Also, the arm section of the robot may have a telescopic mechanism, a rectilinear mechanism or the like, in addition to the joint section including the rotating mechanism. However, from the viewpoint of the balance between the printing quality in the printing operation and the degree of freedom of the robot movement in the non-printing operation, it is preferable that the robot is a multiaxis robot with six or more axes.

2-2. Modified Example 2

In the above embodiments, the description is given of the configuration using screwing or the like as a method of fixing the head to the robot. However, the present disclosure is not limited to such a configuration. For example, the head may be fixed to the robot by gripping the head with a gripping mechanism such as a hand mounted as an end effector of the robot.

2-3. Modified Example 3

In the above embodiments, the description is given of the robot configured to move the head. However, the present disclosure is not limited to such a configuration. For example, a position of a liquid ejecting head may be fixed, and the position and posture of the workpiece relative to the head may be changed three-dimensionally by the robot moving the workpiece. In this case, the workpiece is gripped by a gripping mechanism such as a hand attached to the tip of the robot arm, for example.

2-4. Modified Example 4

In the above embodiments, the description is given of the configuration where printing is performed using one type of ink. However, the present disclosure is not limited to such a configuration but may be applied to a configuration where printing is performed using two or more types of ink.

2-5. Modified Example 5

The use application of the three-dimensional object printer according to the present disclosure is not limited to printing. For example, a three-dimensional object printer that discharges a coloring material solution is used as a manufacturing device for forming a color filter of a liquid crystal display device. A three-dimensional object printer that discharges a conductive material solution is used as a manufacturing device for forming wires and electrodes for a wiring substrate. Alternatively, the three-dimensional object printer can be used as a jet dispenser for applying a liquid such as an adhesive onto a medium.

What is claimed is:

1. A robot teaching method for a three-dimensional object printer that includes a head having a nozzle surface provided with a nozzle array including a plurality of nozzles, and a robot, and that executes a printing operation in which the head discharges a liquid onto a three-dimensional workpiece and the robot changes a relative position and posture between the head and the workpiece, comprising:
    a printing posture setting step of setting a printing posture that is a relative posture between the head and the workpiece in the printing operation, wherein
    when a position where a positional relationship with the nozzle surface is fixed is a first position, and
    a position different from the first position where a positional relationship with the nozzle surface is fixed is a third position,
    the printing posture is set in a virtual space in the printing posture setting step based on a positional relationship between the first position and the workpiece and a positional relationship between the third position and the workpiece.

2. The robot teaching method according to claim 1, wherein
    when a direction along the nozzle array is a nozzle array direction,
    the first position and the third position are different from each other in the nozzle array direction.

3. The robot teaching method according to claim 2, wherein
    a center of the nozzle array is located between the first position and the third position in the nozzle array direction.

4. The robot teaching method according to claim 2, wherein
    the printing operation includes
    a first width printing operation in which the head discharges the liquid in a first width in the nozzle array direction and
    a second width printing operation in which the head discharges the liquid in a second width narrower than the first width in the nozzle array direction,
    the printing posture setting step includes
    a first printing posture setting step of setting a printing posture that is a relative posture between the head and the workpiece in the first width printing operation and
    a second printing posture setting step of setting a printing posture that is a relative posture between the head and the workpiece in the second width printing operation, and a distance between the first position and the third position in the second printing posture setting step is set shorter than a distance between the first position and the third position in the first printing posture setting step.

5. The robot teaching method according to claim 1, wherein
when a straight line passing through the first position and a second position on the workpiece is a first straight line,
a normal line of the workpiece at the second position is a first normal line,
an angle formed by the first straight line and the first normal line is a first angle,
a straight line passing through the third position and a fourth position different from the second position on the workpiece is a second straight line,
a normal line of the workpiece at the fourth position is a second normal line, and
an angle formed by the second straight line and the second normal line is a second angle,
the printing posture is set based on the first angle and the second angle in the virtual space in the printing posture setting step.

6. The robot teaching method according to claim 5, wherein
when a position different from the first position and the third position where a positional relationship with the nozzle surface is fixed is a fifth position,
a straight line passing through the fifth position and the sixth position on the workpiece is a third straight line,
a normal line of the workpiece at the sixth position is a third normal line, and
an angle formed by the third straight line and the third normal line is a third angle,
the printing posture is set based on the first angle, the second angle, and the third angle in the virtual space in the printing posture setting step.

7. The robot teaching method according to claim 1, wherein
a line segment passing through the first position and a second position on the workpiece is set as a first line segment and
a line segment passing through the third position and a fourth position different from the second position on the workpiece is set as a second line segment,
the printing posture is set based on lengths of the first line segment and the second line segment in the virtual space in the printing posture setting step.

8. The robot teaching method according to claim 7, wherein
a position different from the first position and the third position where a positional relationship with the nozzle surface fixed is set as a fifth position,
a line segment passing through the fifth position and a sixth position different from the second position on the workpiece is set as a third line segment, and
the printing posture is set based on lengths of the first line segment, the second line segment, and the third line segment in the virtual space in the printing posture setting step.

9. The robot teaching method according to claim 6, wherein
the fifth position is located between the first position and the third position.

10. The robot teaching method according to claim 6, wherein
when a direction along the nozzle array is a nozzle array direction,
the fifth position is a position different from the first position and the third position in a direction orthogonal to the nozzle array direction.

11. The robot teaching method according to claim 1, wherein
the nozzle array includes a first nozzle array and a second nozzle array, which are arranged in a width direction,
the first position is a position closer to the first nozzle array than to the second nozzle array,
the third position is closer to the second nozzle array than to the first nozzle array.

12. The robot teaching method according to claim 1, wherein
a tool center point of the robot is a position in a normal direction of the nozzle surface relative to the nozzle surface,
the printing posture is adjusted by rotation about the tool center point in the printing posture setting step.

13. A robot teaching method for a three-dimensional object printer that includes a head having a nozzle surface provided with N, N being a natural number of greater than or equal to 2, nozzle arrays including a plurality of nozzles, and a robot, and that executes a printing operation in which the head discharges a liquid onto a three-dimensional workpiece and the robot changes a relative position and posture between the head and the workpiece, comprising:
a printing posture setting step of setting a printing posture that is a relative posture between the head and the workpiece in the printing operation, wherein
N positions whose positional relationship with the nozzle surface is fixed and which are provided so as to correspond to the N nozzle arrays, respectively, and
the printing posture is set based on a positional relationship with the workpiece at the N positions in a virtual space in the printing posture setting step.

14. The robot teaching method according to claim 13, wherein
when straight lines extending from the N positions in a normal direction of the nozzle surface are N straight lines, normal lines of the workpiece at the N positions on the workpiece that intersect the N straight lines are N normal lines, and
angles formed by the N straight lines and the N normal lines are N angles,
the printing posture is set based on a plurality of angles including the N angles in the virtual space in the printing posture setting step.

15. The robot teaching method according to claim 14, wherein
the printing posture is adjusted so as to reduce standard deviation of the N angles in the printing posture setting step.

16. The robot teaching method according to claim 13, wherein
line segments extending in a normal direction of the nozzle surface from the N positions are set as N line segments, and
the printing posture is set based on lengths of the N line segments in the virtual space in the printing posture setting step.

17. The robot teaching method according to claim 16, wherein
the printing posture is adjusted so as to reduce standard deviation of the lengths of the N line segments in the printing posture setting step.

18. The robot teaching method according to claim 1, further comprising, in the following order:
- a data acquisition step of acquiring workpiece data representing at least part of a shape of the workpiece and nozzle surface data representing at least part of a shape of the nozzle surface;
- a printing position setting step of setting a printing position, which is a relative position between the head and the workpiece in the printing operation, based on the workpiece data; and
- the printing posture setting step of setting the printing posture based on the workpiece data and the nozzle surface data.

19. The robot teaching method according to claim 1, wherein
- a posture of the robot in the printing operation is defined based on the printing position and the printing posture.

20. A three-dimensional object printer comprising:
- a head having a nozzle surface provided with a nozzle array including a plurality of nozzles that discharge a liquid; and
- a robot that changes a relative position and posture between the head and a three-dimensional workpiece, wherein
- the nozzle array includes a first nozzle array and a second nozzle array, which are arranged in a width direction,
- when a straight line passing through a first position on the nozzle surface and a second position on the workpiece is a first straight line,
- a normal line of the workpiece at the second position is a first normal line,
- an angle formed by the first straight line and the first normal line is a first angle,
- a straight line passing through a third position different from the first position on the nozzle surface and a fourth position different from the second position on the workpiece is a second straight line,
- a normal line of the workpiece at the fourth position is a second normal line, and
- an angle formed by the second straight line and the second normal line is a second angle,
- when a first printing operation is executed in which the liquid is discharged from the first nozzle array onto the workpiece and no liquid is discharged from the second nozzle array, a relative posture between the head and the workpiece is set based on the first angle and not based on the second angle, and
- when a second printing operation is executed in which the liquid is discharged from both the first and second nozzle arrays onto the workpiece, a relative posture between the head and the workpiece is set based on the first and second angles.

* * * * *